US010662703B2

(12) United States Patent
Ghanizadehgrayli et al.

(10) Patent No.: US 10,662,703 B2
(45) Date of Patent: May 26, 2020

(54) GREEN KINETIC DEVICE FOR BALANCING BUILDING TEMPERATURE IN DIFFERENT CONDITIONS

(71) Applicants: Mannan Ghanizadehgrayli, Babol (IR); Masoud Valinejadshoubi, Babol (IR); Masoud Rasoulilarmaeie, Sari (IR)

(72) Inventors: Mannan Ghanizadehgrayli, Babol (IR); Masoud Valinejadshoubi, Babol (IR); Masoud Rasoulilarmaeie, Sari (IR)

( * ) Notice: Subject to any disclaimer, the term of this patent is extended or adjusted under 35 U.S.C. 154(b) by 277 days.

(21) Appl. No.: 15/859,619

(22) Filed: Dec. 31, 2017

(65) Prior Publication Data

US 2018/0119481 A1  May 3, 2018

(51) Int. Cl.
| | |
|---|---|
| F24F 1/00 | (2019.01) |
| E06B 7/02 | (2006.01) |
| E06B 7/28 | (2006.01) |
| E04C 1/39 | (2006.01) |
| F24F 7/013 | (2006.01) |
| F24F 13/28 | (2006.01) |
| F24F 13/15 | (2006.01) |
| F24F 11/00 | (2018.01) |
| F24F 7/00 | (2006.01) |
| F24S 10/80 | (2018.01) |
| F24S 20/63 | (2018.05) |
| F24S 20/00 | (2018.01) |

(52) U.S. Cl.
CPC ............... *E06B 7/02* (2013.01); *E04C 1/395* (2013.01); *E06B 7/28* (2013.01); *F24F 7/00* (2013.01); *F24F 7/013* (2013.01); *F24F 11/0001* (2013.01); *F24F 13/15* (2013.01); *F24F 13/28* (2013.01); *F24S 10/80* (2018.05); *E06B 2007/023* (2013.01); *F24F 2007/003* (2013.01); *F24F 2007/004* (2013.01); *F24F 2011/0002* (2013.01); *F24S 20/63* (2018.05); *F24S 2020/18* (2018.05); *Y02B 10/20* (2013.01); *Y02B 10/30* (2013.01); *Y02E 10/44* (2013.01)

(58) Field of Classification Search
CPC .......... A01G 9/14; A01G 9/243; F24A 10/80; E06B 7/02; E04C 1/395
USPC ........................ 47/17; 126/569–713; 454/85
See application file for complete search history.

(56) References Cited

U.S. PATENT DOCUMENTS

| | | |
|---|---|---|
| 1,344,561 A | 6/1920 | Poehner |
| 4,043,316 A | 8/1977 | Arent |
| (Continued) | | |

*Primary Examiner* — Vivek K Shirsat
(74) *Attorney, Agent, or Firm* — NovoTechIP International PLLC

(57) ABSTRACT

An improved double skin facade system for buildings is disclosed. In one embodiment, the double skin facade system is a multi-functional device that can be used in a variety of ways to provide heat, produce and store solar and wind electricity, take advantage of natural and biological properties of plants, and provide cooling and natural ventilation. In one embodiment, the device is comprised of a mounting structure, and multiple columns of interconnected modules. Through the interconnected movable modules, the double skin facade system can easily switch functionalities between a heater, ventilator and cooling system. The device is easy and inexpensive to operate and its functionalities can be changed with simple touches of buttons.

20 Claims, 24 Drawing Sheets

(56) References Cited

U.S. PATENT DOCUMENTS

| | | | |
|---|---|---|---|
| 4,184,479 A * | 1/1980 | Ratliff, Jr. | A01G 9/243 |
| | | | 126/605 |
| 5,864,989 A | 2/1999 | Funatsu et al. | |
| 5,892,672 A * | 4/1999 | Preller | H02M 3/33515 |
| | | | 363/21.13 |
| 7,227,077 B2 * | 6/2007 | Kleinwachter | A01G 9/1438 |
| | | | 136/248 |
| 8,528,621 B2 | 9/2013 | Murphy, Jr. et al. | |
| 9,624,719 B2 | 4/2017 | Rupel | |
| 9,702,185 B2 | 7/2017 | Jelic et al. | |
| 2010/0263660 A1 * | 10/2010 | Thorne | H02S 20/22 |
| | | | 126/601 |
| 2013/0319504 A1 | 12/2013 | Yang et al. | |

* cited by examiner

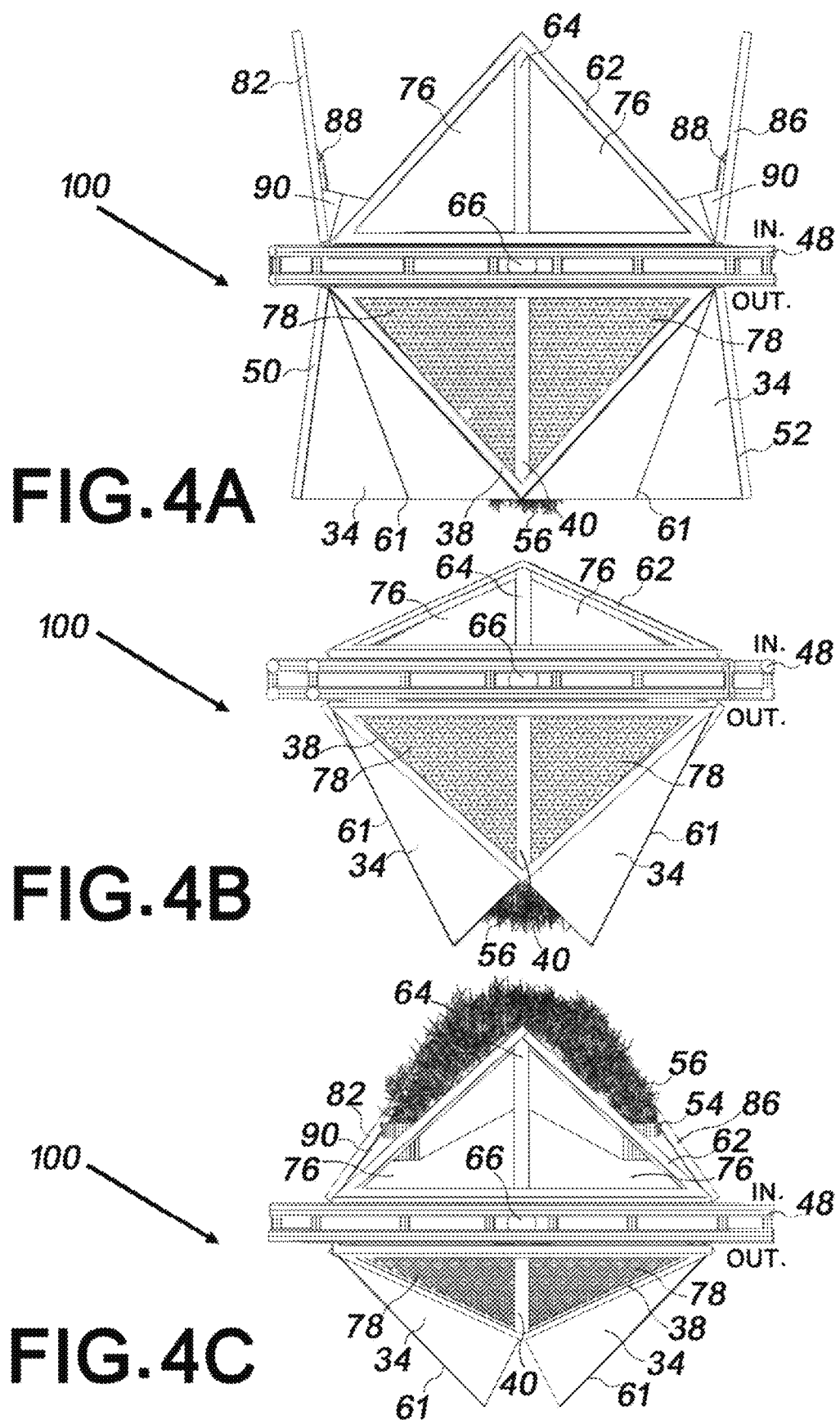

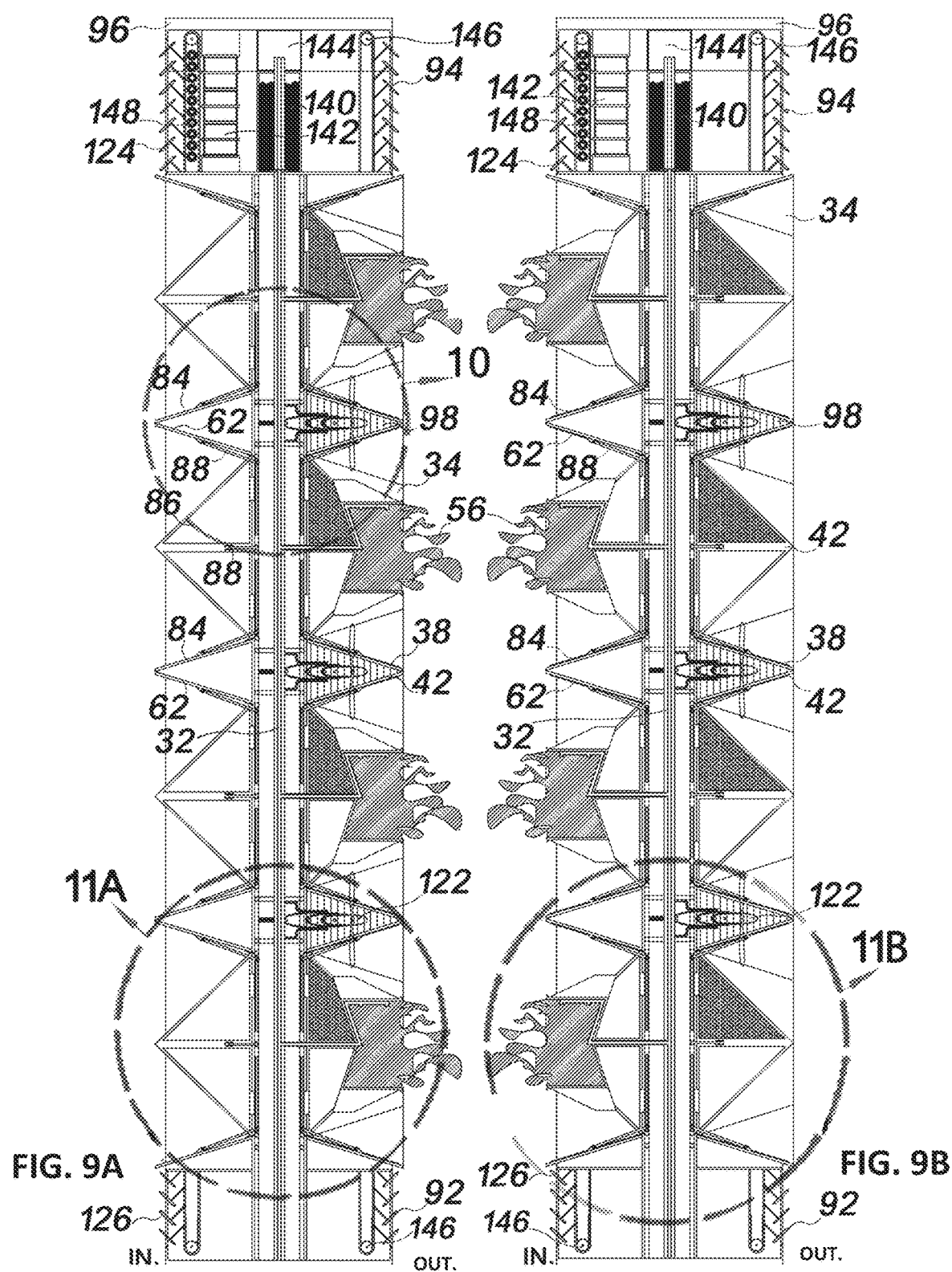

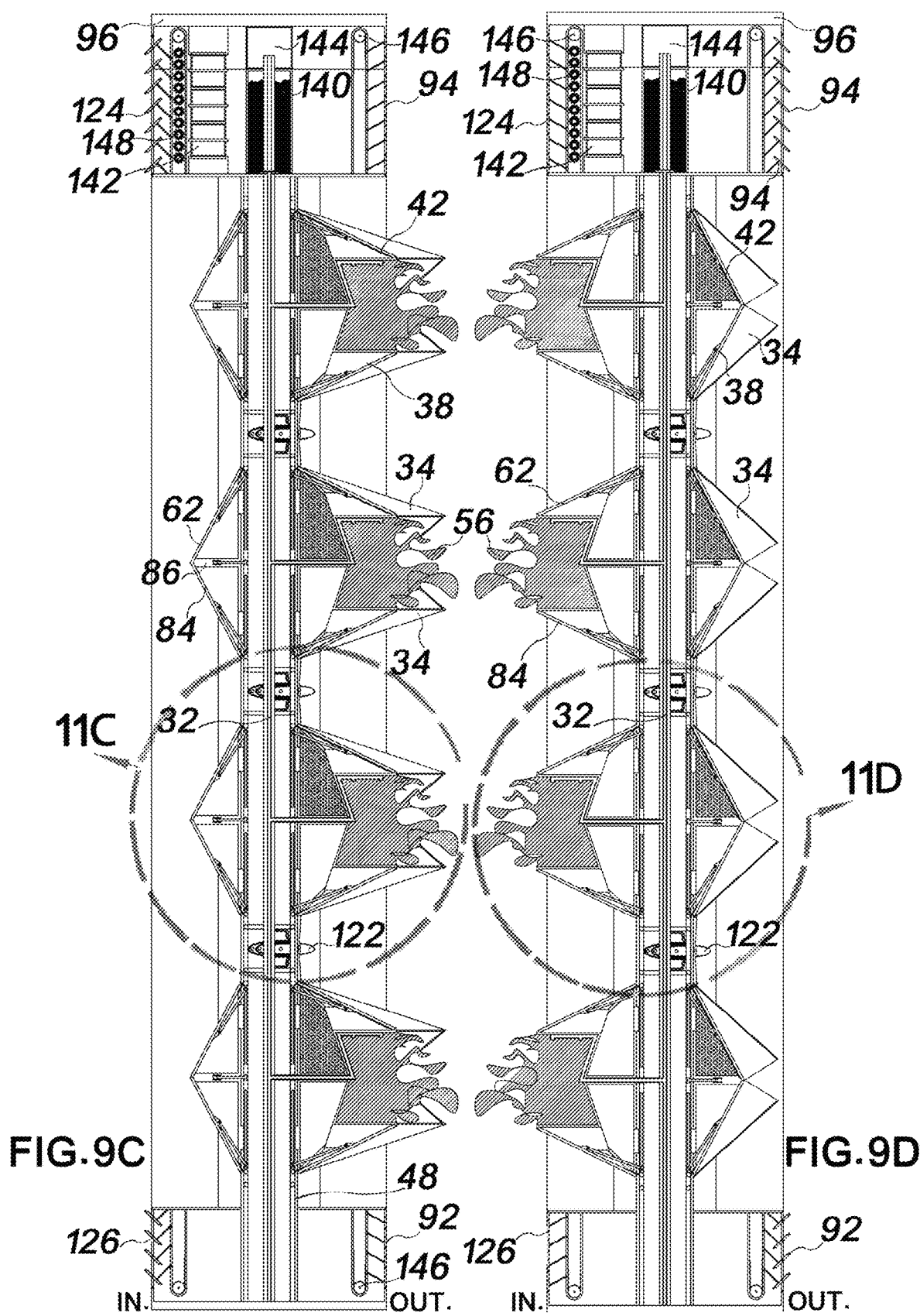

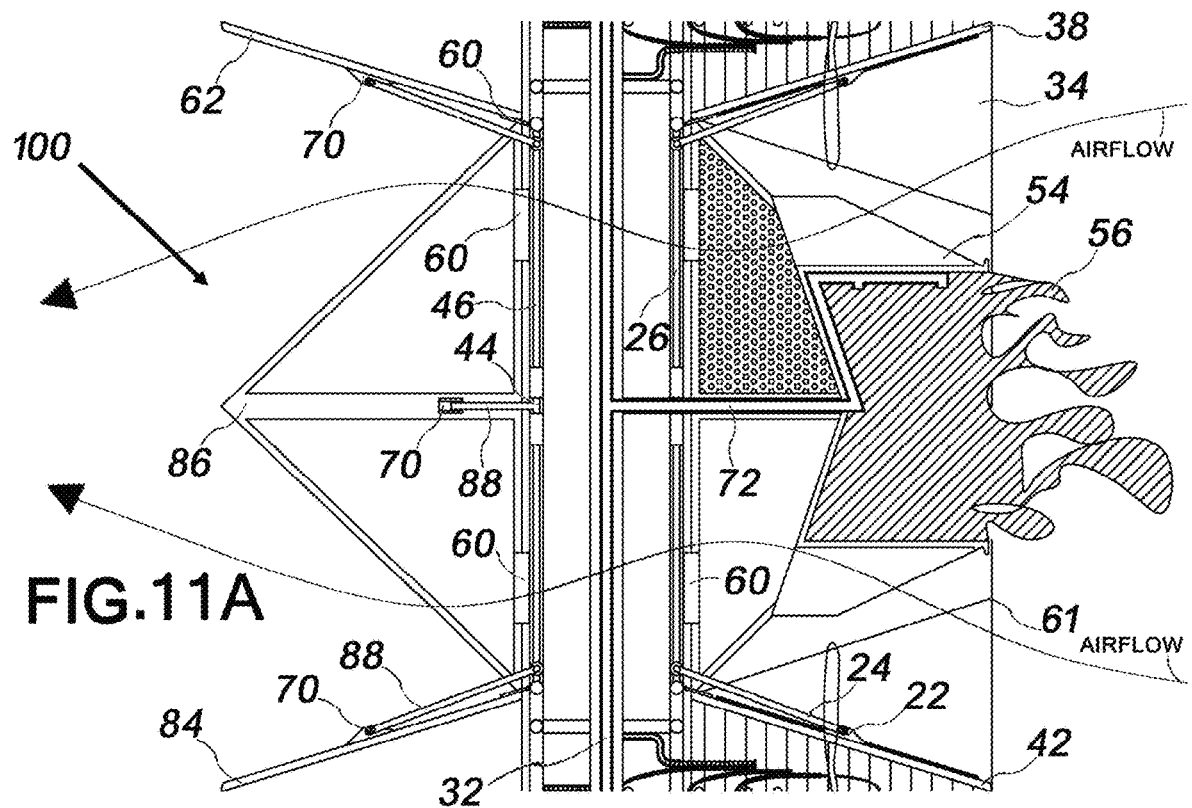

GREEN KINETIC DEVICE FOR BALANCING BUILDING TEMPERATURE IN DIFFERENT CONDITIONS

CROSS REFERENCE TO RELATED APPLICATION

This application claims the benefit of priority to an Iran patent application having serial number 13965011400003000203, which was filed on Mar. 30, 2017, and is incorporated by reference herein in its entirety.

TECHNICAL FIELD

The present application relates generally to energy efficient heating and ventilation, and more particularly to a double skin facade system configured to produce electricity through solar and wind energy for heating air and to provide cooling, natural ventilation, and insulation by taking advantage of natural and biological properties of plants, among other things.

BACKGROUND

Solar heaters have gained popularity in recent years due their environmentally efficient manner of providing heat and because of low energy costs associated with their use. Most currently available solar air heaters operate by converting sunlight to heat within a glass or plastic (e.g., compressed plastic or UPVC) covered enclosure. The heat is then trapped in the enclosure by the glass or plastic and released into the building as desired.

In general, solar heaters are economical to build or buy and require minimal energy costs to operate, as the energy received from the sun is free. As such, these devices provide an easy inexpensive method of using the energy of the sun to augment heating of homes and other buildings. However, currently available solar heaters are yet to be widely used. One of the reasons for this may be that available systems do not address how they can be integrated into a building and used alongside other heating or cooling systems. For example, most prior art devices do not take into account how they affect the amount of sunlight that enters the building. A lot of the solar heaters block windows. As a result, these devices prevent sunlight from coming in and also block the view of the residents. Moreover, current systems can be improved to address not only heating, but also other related issues such as ventilation.

Therefore, a need exists for providing an improved energy efficient heating device that is easy to use and integrate into a building and offers solutions that address heating, ventilation, beautification and more.

SUMMARY

A multi-functional heating and ventilation device is provided. In one implementation, the multi-functional heating and ventilation device includes a mounting structure having an interior side and an exterior side, a water storage unit, at least one set of vents on each of the interior side and the exterior side, a plurality of modules housed in the mounting structure, each module having an exterior side and an interior side and each module comprising at least one movable panel containing one or more collector surfaces on the module's exterior side and at least one glass panel on each of the module's exterior side and interior side, a rotatable plant housing, and a wind turbine. In one implementation, the one or more collector surfaces are configured to collect solar energy, the wind turbine is configured to collect and convert wind energy, the plant housing is configured to house one or more plants, and the water storage unit is configured to provide water to the one or more plants. In one implementation, each of the plurality of modules is also configured to create a protected space in between the module's exterior side and the module's interior side for heating air when the movable panels and the glass panels are moved to close the module, when the plurality of protected spaces are configured to create an open passageway for ventilation in the mounting structure.

BRIEF DESCRIPTION OF THE DRAWINGS

Features of the subject technology are set forth in the appended claims. However, for purpose of explanation, several implementations of the subject technology are set forth in the following figures.

FIGS. 4A-4C illustrate schematic drawings of a top view of a portion of one building block module of an improved multi-functional air heater and natural ventilating device, during the three different configurations of the building block module, according to an implementation.

FIG. 9A-9D illustrate side views of a portion of the improved multi-functional air heater and natural ventilator device, for four different configurations of the building block modules, according to an implementation.

FIG. 11A-11D illustrate side views of a portion of the building block module of the improved multi-functional air heater and natural ventilator unit, for four different configurations of the building block modules, according to an implementation.

DETAILED DESCRIPTION

Figure 1A:
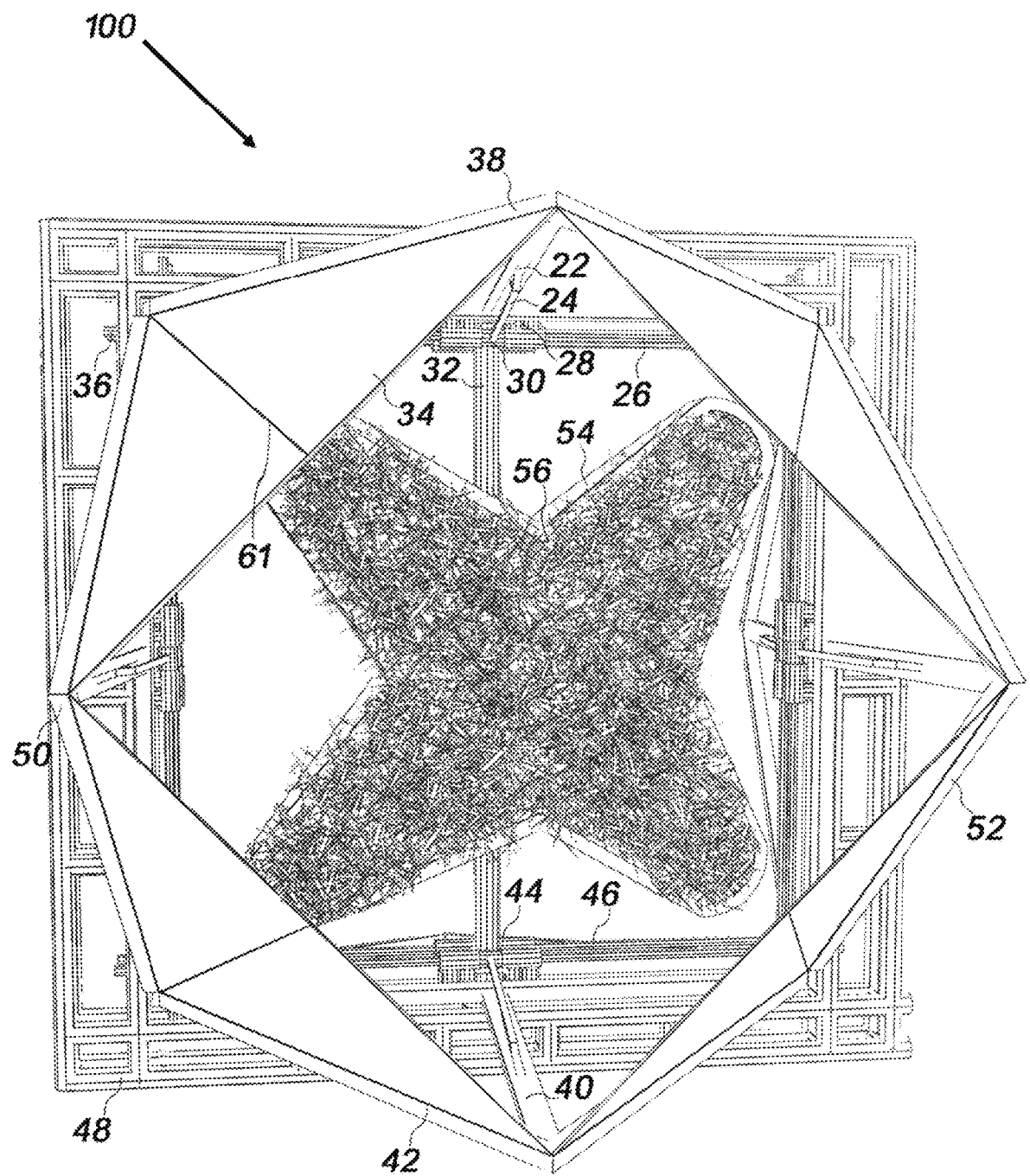
FIGS. 1A-1B illustrate schematic drawings of the exterior and interior sides, respectively, of one building block module of an improved multi-functional air heater and natural ventilating device, when the device is being used as a ventilator and cooling system, according to an implementation.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. As part of the description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

Solar heaters are very useful in augmenting a building's heating system in an efficient low-cost manner. However, most currently available solar heaters only provide heat without addressing other related issues. For example, they may block windows thereby acting as a visual barrier and preventing sunlight from entering a building. Moreover, most do not provide a solution for cooling a building when it is hot outside. Most such devices also do not provide mechanisms for taking advantage of other natural resources such as wind energy and biological properties of plants.

A solution is proposed here to solve these issues and more by providing an improved multi-functional air heater and natural ventilator device that corresponds to changing climate conditions by offering heating, cooling and natural ventilation, sunlight, air purification, producing and storing electric energy, and providing a place for growing one or more plants. In one embodiment, the system also provides acoustic and thermal insulation of windows. Heat can be provided during the cold months by using collector surfaces that heat the air and/or taking advantage of wind energy to produce electricity. Cooling and ventilation can be provided when it is hot outside by changing the shape of the system and creating a more shaded area inside the building, and providing more ventilation and air flow.

In one embodiment, the improved multi-functional heater and ventilator is made of one or more building block modules such as the ones shown in FIGS. 1A-1B and 2A-2B. In one implementation, the body of each module is made from an unplasticized polyvinyl chloride (UPVC) material that forms a unit consisting of several components. In an alternative implementation, the body of each module is made from polyvinyl chloride (PVC) or a similar material. Moreover, in one implementation, various components of the module 100 may made from different materials.

Figure 1B:
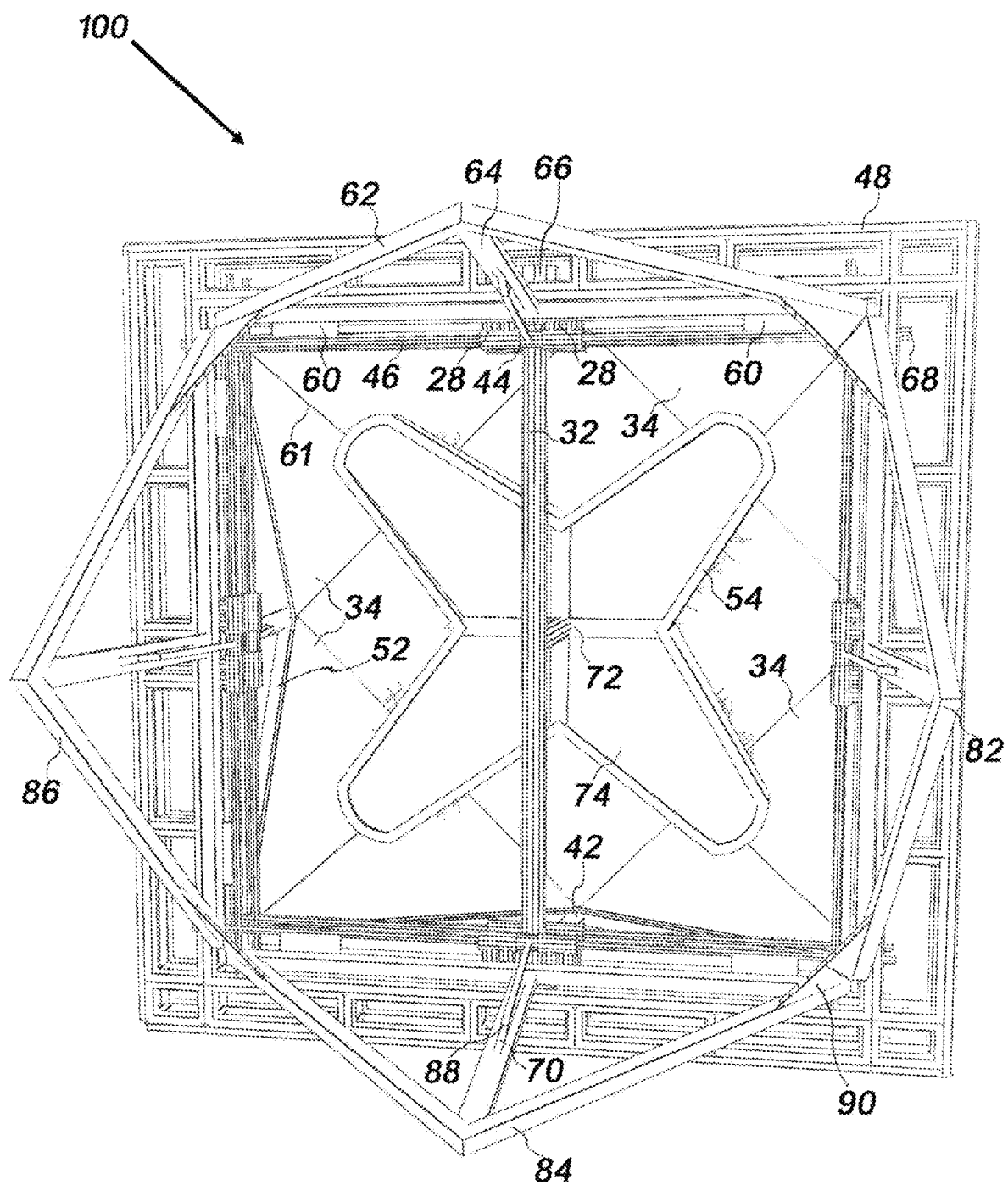

FIGS. 1A-1B illustrate schematic drawings of the exterior and interior sides, respectively, of one implementation of a module 100 of the improved multi-functional air heater and natural ventilator device, when the device is being used as a ventilator and cooling device. In one implementation, the module 100 includes a structural frame 48 which forms the outer edges of the module 100 and provides support for the various components that make up the module 100. In one implementation, the structural frame 48 houses a subframe 46 that forms the inner edges of the module 100 to also provide support for various components. In one implementation, the structural frame 48 and subframe 46 are square in shape, with the subframe 46 having smaller sides that fit inside the structural frame 48. In alternative implementations, other shapes may be utilized.

In one implementation, the subframe 46 is connected to four connector bars 22 and 40 (only two of the four connector bars are labeled) on the exterior side of the module 100 (FIG. 1A), and to four additional connector bars 64 and 70 (only two of the four connector bars are labeled) on the interior side of the module 100 (FIG. 1B). Each of the connector bars is connected to a triangular shaped movable panel. Thus, connector bars 22 and 40 (and two additional ones) are connected to movable panels 50, 52, 38 and 42, respectively. On the other side, connector bars 64 and 70 (and two additional ones) are connected to movable panels 86, 62, 82 and 84. Each of these movable panels can move around the axis of the subframe 46 to which they are connected, to open and close the panels as desired. In one implementation, the movable panels 50, 52, 38 and 42 are connected to four side panels 34 which are also movable and foldable. Each side panel 34 can be folded by a folding hinge 61. In one implementation, the side panels 34 can be opened, when the movable panels to which each side panel 34 is connected are opened. The side panels help attract and retain wind, and when the wind is blowing, assist in turning the wind turbines (discussed below). Moreover, the side panels help pull and guide wind to the inside of the building.

Figure 2A:
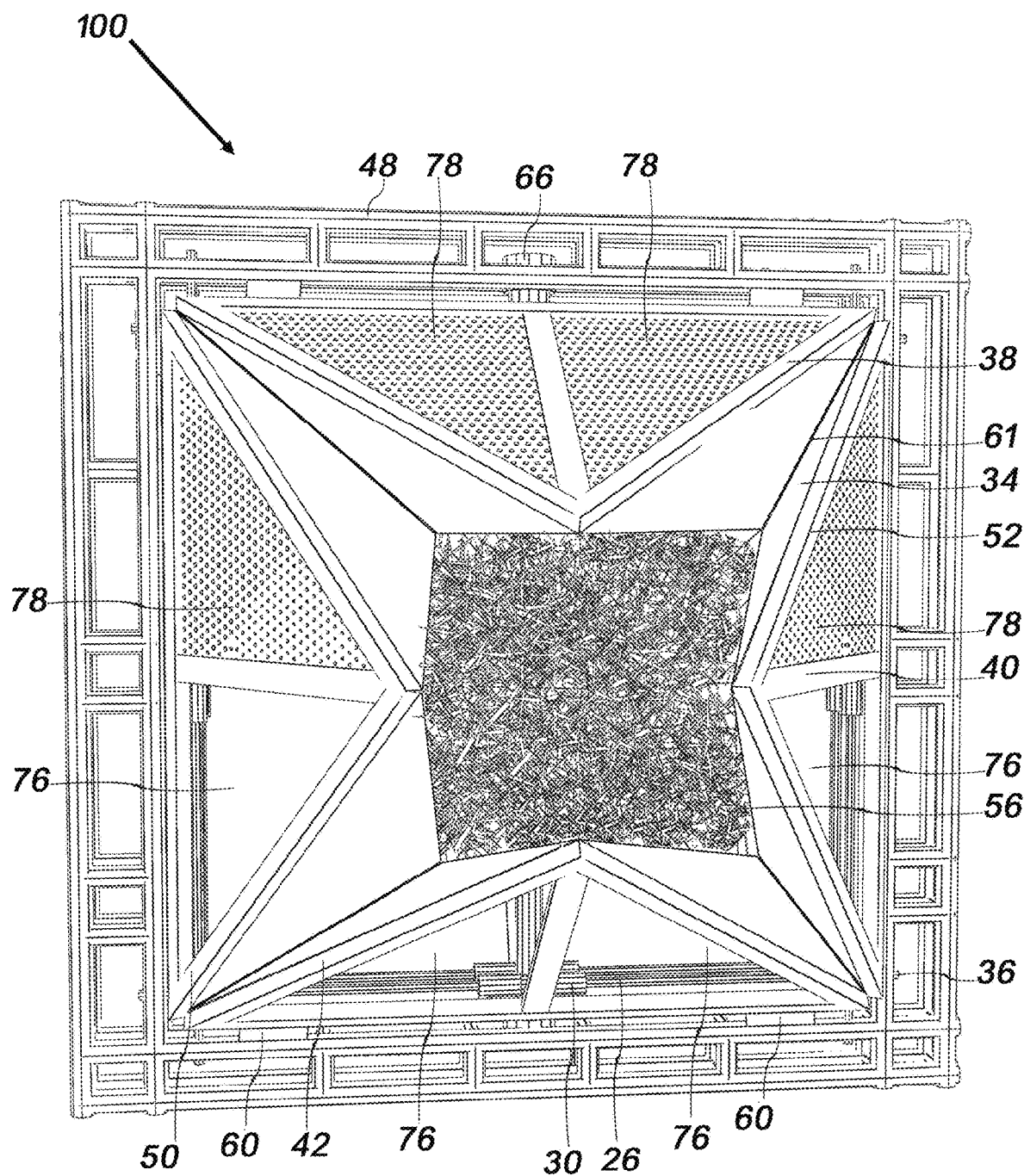
FIGS. 2A-2B illustrate schematic drawings of the exterior and interior sides, respectively, of one building block module of an improved multi-functional air heater and natural ventilating device, when the device is being used as a heater with a plant housing facing outside, according to an implementation.
Figure 2B:
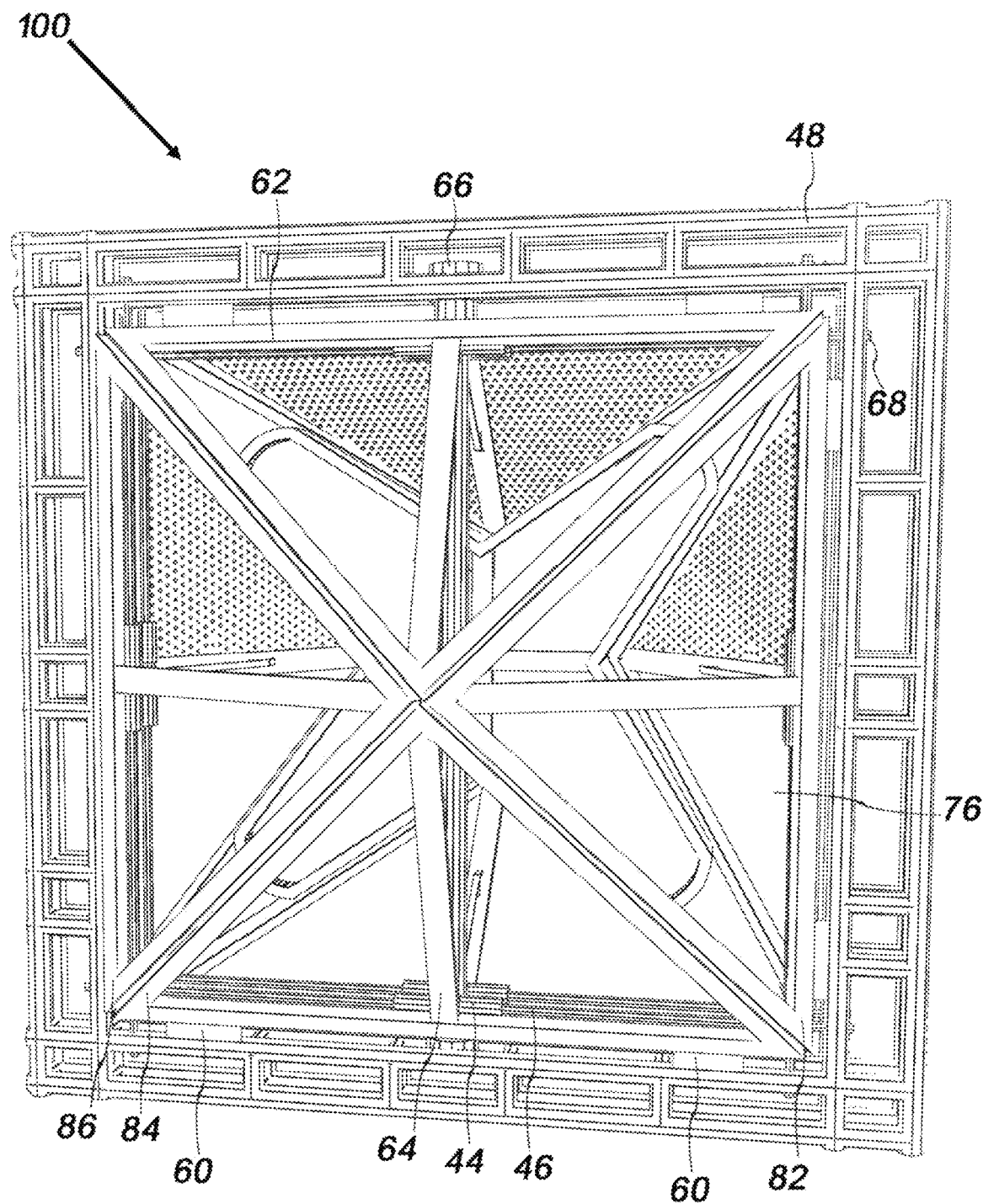

In one implementation, each connector bar 22 and 40 is connected to a corresponding lever 24 (only one lever is labeled in FIG. 1A). Similarly, each connected bar (64, 70, etc.) on the other side of the module 100 is connected to a corresponding lever 88 (only one of the four levers is labeled in FIG. 1B). Each lever 24 is in turn connected to an actuator 30, while each lever 88 is connected to an actuator 44. In one implementation, the actuators 30 and 44 are configured to move the levers 24 and 88, respectively, which in turn move their corresponding connecting bars, and ultimately the movable panels and side panels, to change the shape of the module 100 and thus offer various features for different weather conditions. Multiple hinges 60 that are connected to both the subframe 46 and movable panels 86, 62, 82 and 84 (FIG. 1B) enable the movable panels to be opened as shown in FIGS. 1A-1B or closed as shown in FIGS. 2A-2B. Similar hinges 80 that are connected to the subframe 46 and movable panels 50, 52, 38 and 42 (FIG. 2A) enable the movable panels to be opened as shown in FIG. 1A or closed as shown in FIG. 2A. In one implementation, two hinges 60 are placed on each side of the subframe 46.

In one implementation, module 100 also includes a vertical rod 32 which is connected to a housing 54 via a horizontal rod 72 (FIG. 1B). The housing 54 is configured for use as a plant housing for planting herbs, flower and other small plants 56. The housing 54 is configured as a hydroponics system for growing plants without soil and in a vertical configuration. In one implementation, the housing 54 includes a planting bed consisting of a moist protective layer. FIG. 1A illustrates the front side of the housing 54 which provides a container for holding plants, while FIG. 1B shows the back siding 74 of the housing 54. The housing 54 provides a configuration for planting household herbs and flowers in buildings that do not provide outdoor space for the residents to plant greenery. Moreover, this configuration makes use of beneficial biological properties of plants to conserve energy. For example, plants have the ability to absorb and retain solar heat radiation without heating their surrounding areas. This is because about 60% of solar heat absorbed by plants is converted to latent heat in the plant. As a result, the temperature of a plant absorbing solar heat radiation is, in general, lower than metal or plastic shutters. Thus, by placing plants in front of a window instead of glass or shutters, we can ensure that less heat enters the building, during hot seasons. Additionally, plants provide air purification properties by absorbing certain air pollutants and/or converting others to different elements. As a result, when air enters the module 100, in the open module configuration shown in FIGS. 1A-1B, it is purified to a certain degree before entering the building.

The module 100 also helps keep a building cooler by providing modular shading. When the module 100 is open, as illustrated in FIGS. 1A-1B, each of the panels 50, 52, 38 and 42 open side panels 38 which function as shutters to prevent direct sunlight from entering and heating the building.

FIGS. 2A-2B illustrate the exterior side and interior sides of the module 100, respectively, when the module 100 is closed with the plant housing facing the outside, in one implementation. This configuration may be used when ventilation is not needed and/or the building needs to be kept warm. When the weather is cold outside, closing the module 100 ensures that cold air does not enter the building. Moreover, closing the module 100 creates a protected space between the movable panels 50, 52, 38 and 42 and the movable panels 62, 82, 84, and 86. Additionally, it exposes collector surfaces 78 to sunlight which leads to warming up the air inside the protected space of module 100 and producing solar energy. As illustrated in FIG. 1B, each movable panel includes two collector surfaces 78. In one implementation, the angle of the movable panel 38, when the module 100 is closed, is such that it provides maximum exposure to the sun's radiation for the collector surfaces 78 which collect the heat and solar energy of the sun. Additionally, each of the movable panels 50 and 52 include one collector surface 78 for collecting solar energy. In one implementation, each collector surface 78 is made of materials that are designed for collecting solar energy. In one configuration, each of the collector surfaces include a plurality of small openings to allow light to travel inside the building and allow the inhabitants to view the outside. This prevents the improved multi-functional heater and ventilator from blocking the view. In one implementation, the remaining portion of the panels 50 and 52 are made from glass panels 76 to maximize absorption of sunlight and prevent heat from escaping the protected space. In one implementation, the glass panels 76 are made from anti-reflective glass. Glass panel 76 is also included, in one implementation, in the movable panels 50, 52, 38 and 42 in the exterior side and movable panels 62, 82, 84, and 86 in the interior side of the module 100.

In one implementation, when the module is closed, as shown in the configuration of FIG. 2A, the side panels 34 are folded to form four elongated wings on each side of the module 100 which can be used to form funnels that help produce electricity as explained in more detail below. As illustrated, at least part of the plant 56 is exposed directly to the outside air and sunlight in this configuration. This can help the plant 56 receive required sunlight. Moreover, because parts of the plant 56 are inside the protected space, exposing the plant 56 to sunlight, in this manner, creates a greenhouse like environment in the protected space which generates heat. This increases the temperate of the protected space, thus indirectly heating the building. As a result, the amount of energy needed to heat the building is decreased.

Figure 3A:
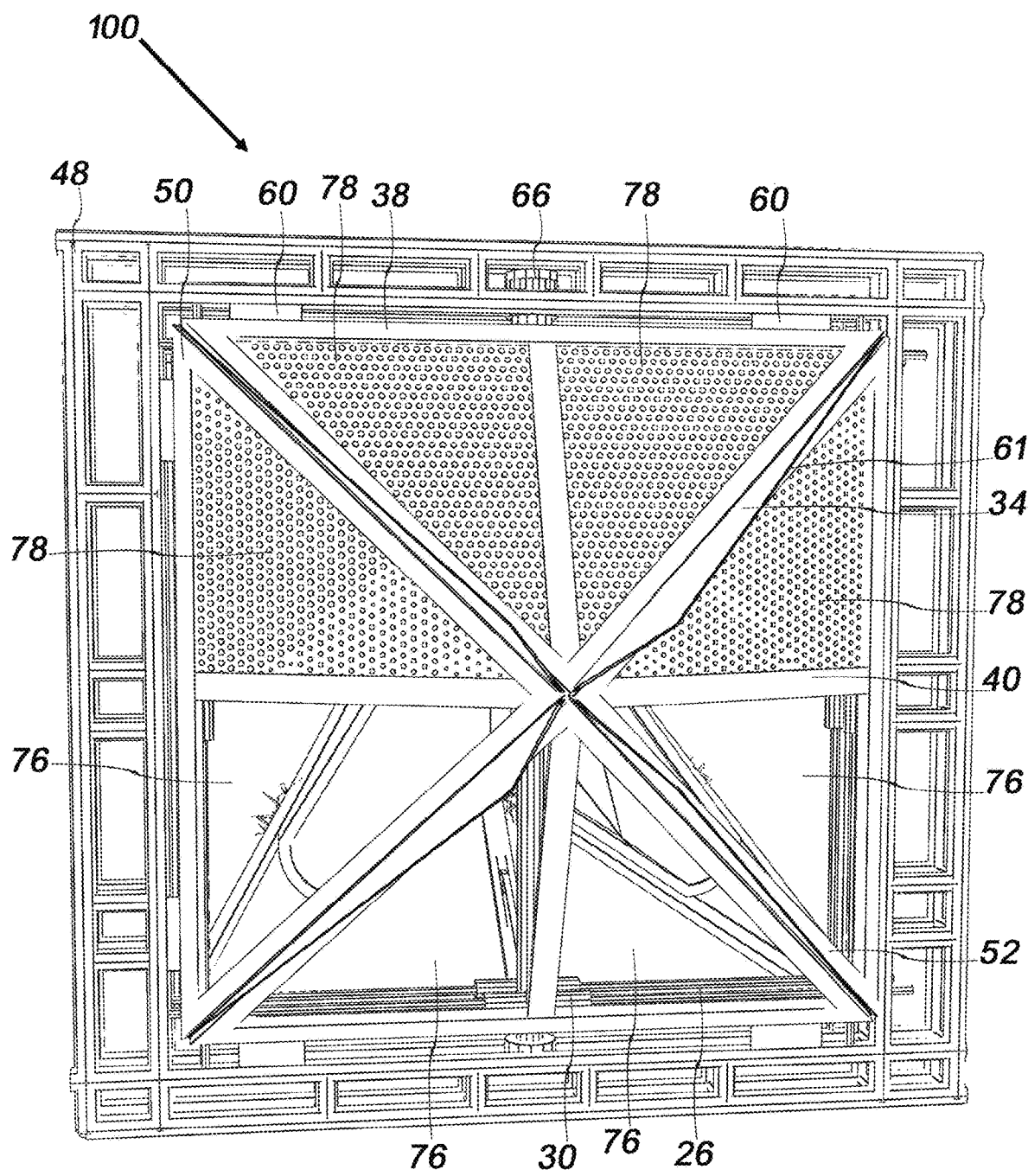
FIGS. 3A-3B illustrate schematic drawings of the exterior and interior sides, respectively, of one building block module of an improved multi-functional air heater and natural ventilating device, when the device is being used as a heater with a plant housing facing the interior, according to an implementation.
Figure 3B:
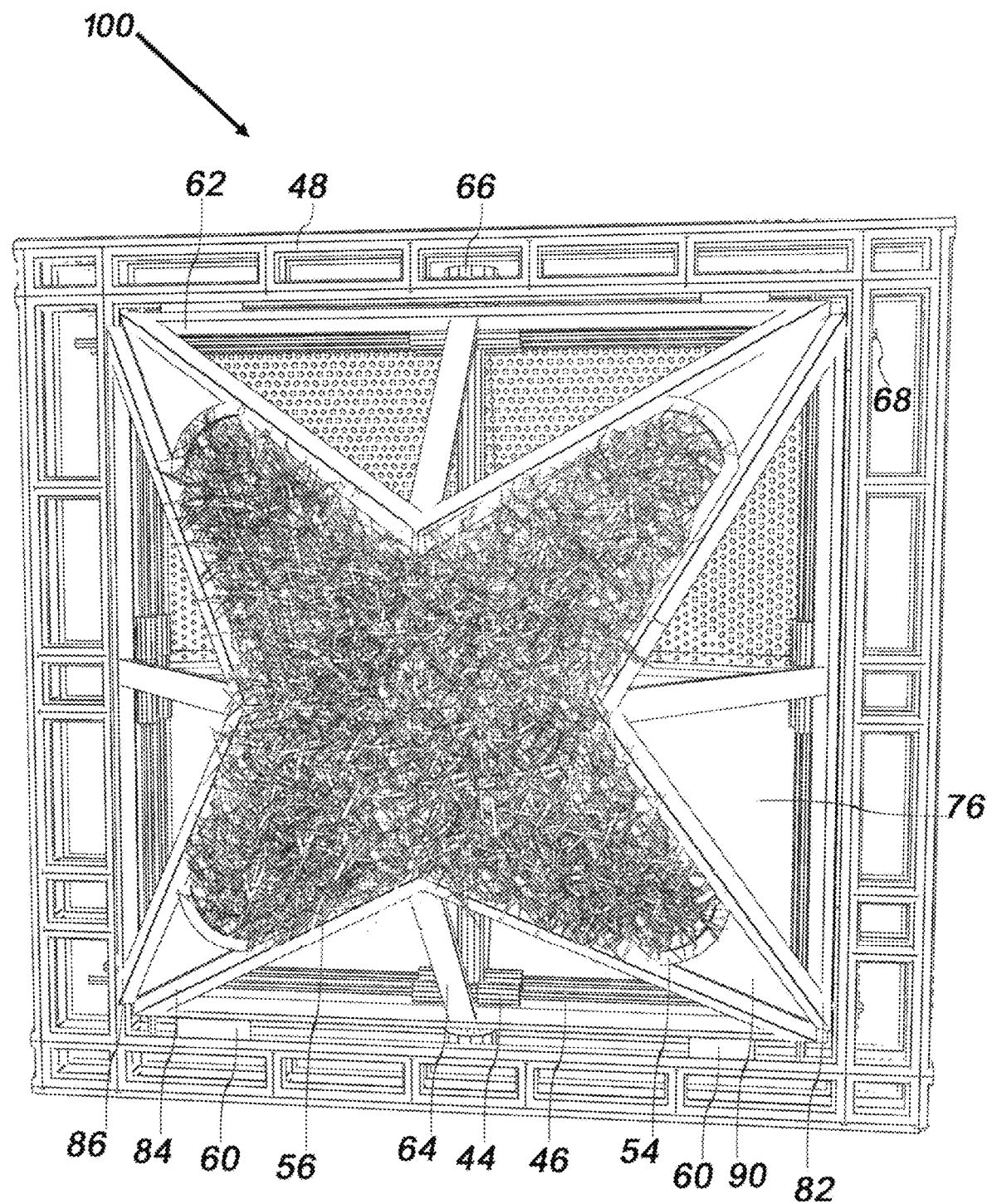

FIGS. 3A-3B illustrate an alternative configuration for closing the module 100. This configuration may be used when the weather is too cold outside to expose the plant 56 to the outdoor environment and/or when a resident desires access to the plant 56 for picking the herbs and/or trimming the plant 56. This configuration may be achieved by using an actuator 66 that is attached to the vertical rod 32 and configured to turn the vertical rod 32 around its own axis. Because the vertical rod 32 is connected to the horizontal rod 72 which is in turn connected to back side of the housing 54, once the vertical rod 32 turns, it turns the housing 54 with it thus enabling a user to move the plant housing 54 inside the building, as illustrated in FIG. 3B. As the plant housing 54 turns toward the inside of the building, the movable panels 50, 52, 38 and 42 move closer to each other such that their edges meet. In one implementation, the edges fit inside each other to provide complete insulation from the outside environment for the protected space, as illustrated in FIG. 3A. Similarly, the edges of the movable panels 62, 82, 84, and 86 fit into corresponding slots (not shown) around the perimeter of the housing 56 (FIG. 3B), such that a completely insulated protected space is created in between the two closed sides of the module 100.

In one implementation, an adjustable part 90 is positioned in each of the four corners where the movable panels 62, 82, 84, and 86 meet (FIGS. 1B and 3B). In one implementation, the adjustable part 90 is made from a flexible material that can stretch when pulled and can revert back to its original size when released. This is useful as, because of its flexibility, each adjustable part 90 can fill the space between the curved edges of the housing 54 and the two edges of adjacent movable panels to ensure there is no space left between the movable panels and the housing 54, thus ensuring insulation of the protected space and preventing air from entering and exiting the protected space.

FIGS. 4A-4C illustrate top views of a portion of the module 100, during three different configurations of the module 100, in one implementation. FIG. 4A illustrates a top view of the structural frame 48 when the module 100 is open to allow ventilation. As can be seen, in this configuration, the side panel 34 is fully open, while the top movable panel 38 is facing upward. A small portion of the plant 56, which is facing the outside can be seen from this view. FIG. 4A also illustrates a top view of the actuator 66, along with the side panel 62 which is also facing upward. The two adjustable parts 90 take the form of small triangles in this configuration as there is no need for their extension.

FIG. 4B illustrates a top view of the structural frame 48, when the module 100 is closed while the plant 56 is facing the exterior side, in one implementation. As can be seen, in this configuration, the side panel 34 is folded and the movable panels 50, 52, 38 and 42 (only 38 is shown in FIG. 4B) on the exterior side and 62, 86, 84 and 82, on the interior side (only 62 is shown in FIG. 4B) are facing downward to close the module 100. A portion of the plant 56 can be seen from this vantage point, showing that it is exposed to the outside. In this configuration, the collector surfaces 78 are configured for maximum exposure to sunlight.

FIG. 4C illustrates a top view of the structural frame 48, when the module 100 is closed while the plant 56 is facing the interior side of the building, in one implementation. As can be seen, in this configuration, the side panel 34 is also folded, but at a slightly different angle from that of FIG. 4B, to close the space that was left before for the plant 56. Moreover, the movable panels 50, 52, 38 and 42 (only 38 is shown in FIG. 4B) on the exterior side and 62, 86, 84 and 82, on the interior side (only 62 is shown in FIG. 4B) are facing downward to completely close the module 100. Plant 56 is facing the interior side of the building and the two adjustable parts 90 extend to fully enclose the protected space of the module 100, thus creating a protected area in the middle.

In one implementation, a module 100 acts as a building block for an improved multi-functional air heater and natural ventilator device acting as a window or used in place of a portion or all of a wall. In one implementation, the improved multi-functional air heater and natural ventilator device takes the form of a double skin façade that forms part or all of a wall. Thus, two or more modules 100 can be attached to each other to form a double-skin facade 110, such as the one illustrated in FIGS. 5A-5D. In one implementation, the double skin facade 110 is rectangular in shape and the number of modules 100 in each row and column of the double skin facade 110 varies depending on the size and requirements of the building in which it is being used. Alternatively, the double skin facades 110 may be manufactured in one or more standard sizes having a standard number of modules 100. In an alternative implementation, the double skin facade 110 may be square in shape with the same number of modules 100 in each row and column.

Figure 5A:
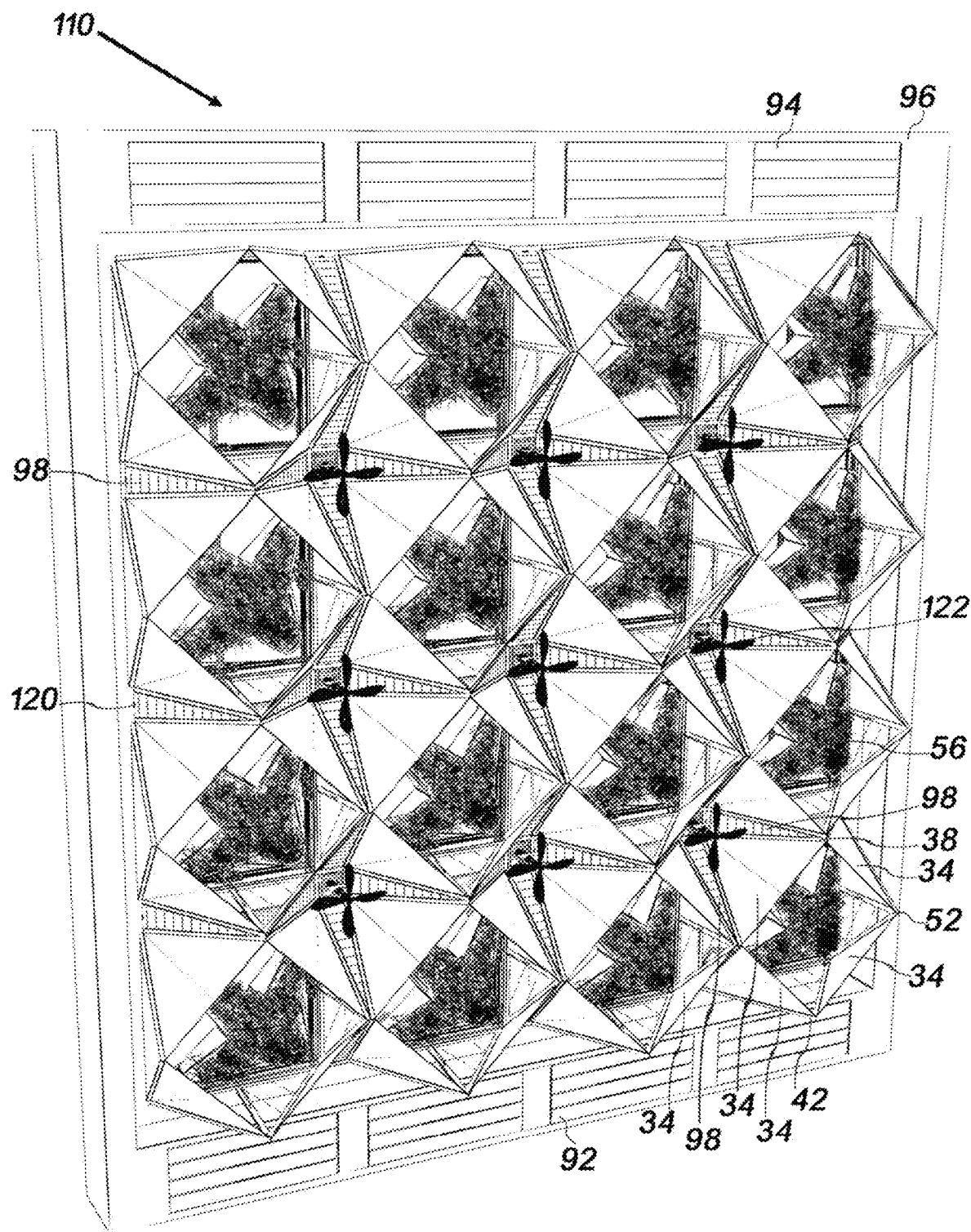
FIGS. 5A-5D illustrate schematic drawings of various vantage point views of the exterior side (FIGS. 5A-5C) and the interior side (FIG. 5D) of an improved multi-functional air heater and natural ventilating device, when the building block modules are open, according to an implementation.

FIG. 5A illustrates one implementation of the exterior side of a double skin façade 110, when the modules 100 are open. In one implementation, modules 100 are attached to each other via movable triangular shaped shells 98. The movable triangular shaped shells 98 may be made from compressed plastic for its low weight and ability to easily fold. The shells 98 are connected to side panels 34 and, in one implementation, move with them when modules 100 are opened, to form funnel shaped structures in between each four adjacent modules 100. The funnel shaped structures are formed when the shells 98 move to meet the edges of the movable panels 50, 52, 38 and 42. In this manner, a funnel is formed from the combination of the shells 98 and the movable panels 50, 52, 38 and 42 of four different modules. The shape of the funnel results in an increase in speed of wind. A wind turbine 122 is located at the center of each funnel shape structure to take advantage of the shape of each funnel shaped structure which increases the speed and power of wind. On a windy day, this causes the wind turbine to turn faster, thus producing electric energy from the natural force of wind. In this manner, the double skin façade 110 can take advantage of both wind and solar energy to produce electricity. The shape of the funnel concentrates the force of the wind, thus enabling the system to produce more electricity from the wind. In one implementation, a motor (or actuator) 120 placed on the rotation axis of each row of shells 98 can be used to rotate a row of shells 98 around their rotation axis in a circular manner. This increases the speed by which the shells 98 rotate, thus producing more electricity.

In one implementation, the double skin façade 110 includes a plurality of top exterior vents 94 located above each column of modules 100 and a plurality of bottom exterior vents 92 located below each column of modules 100 for enabling various ventilation configurations. In one implementation, the plurality of top exterior vents can be opened together, while the plurality of bottom exterior vents can also be opened together using known processes used in the art.

In one implementation, the top exterior vents 94, bottom exterior vents 92, and the plurality of modules 100 are positioned inside a mounting structure 96. In one implementation, the mounting structure 96 is made from a UPVC material and is shaped to accommodate the required number of modules 100.

Figure 5B:
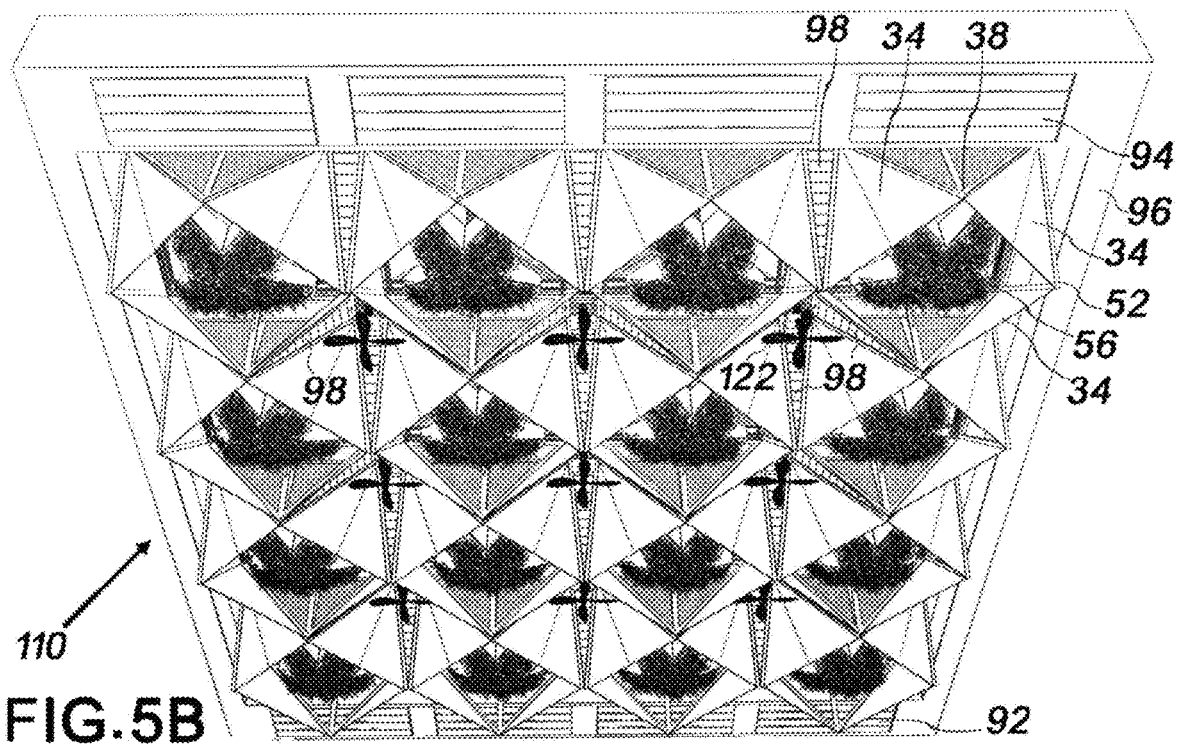
Figure 5C:
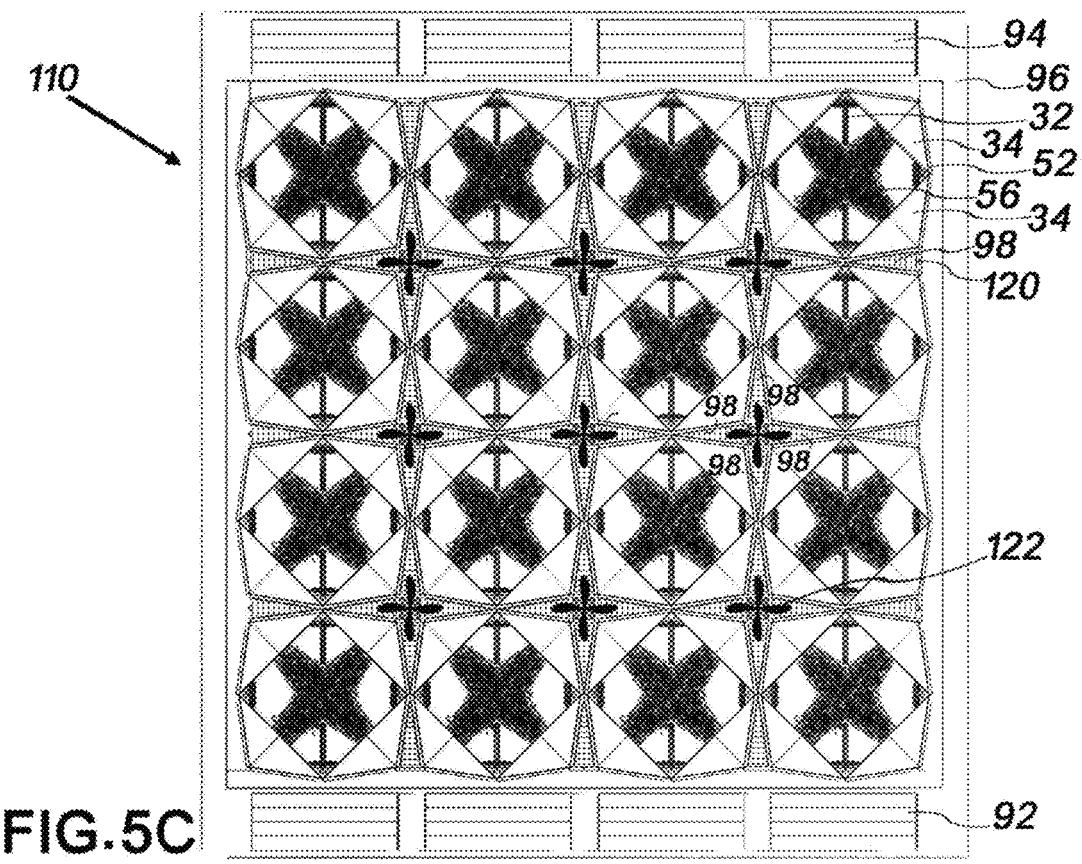

FIG. 5B illustrates a top view of the exterior side of the double skin facade 110, when the modules 100 are open, in one implementation. This view better illustrates the shape of each funnel shaped structure. FIG. 5C illustrates a front view of the exterior side of the double skin facade 110, when the modules 100 are open, in one implementation.

Figure 5D:
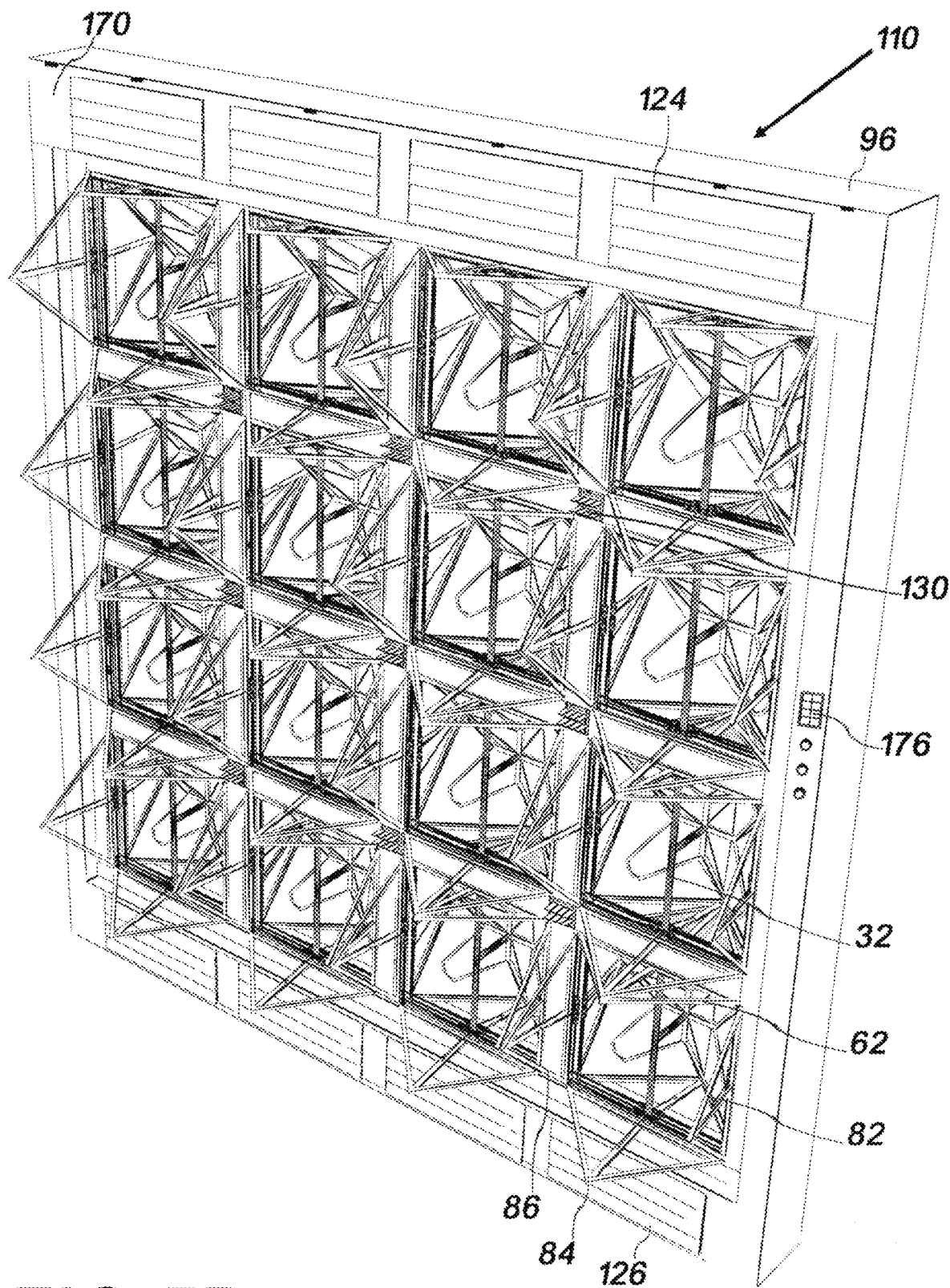

FIG. 5D illustrates a slanted view of the interior side of the double skin facade 110, when the modules 100 are open, in one implementation. The interior side of the double skin façade 110 includes, in one implementation, a plurality of top interior vents 124 and a plurality of bottom interior vents 126 for allowing air to travel in and out of the building. In one implementation, the interior side also includes a hatch 170 that can be opened to provide access to a water storage unit for watering the plants 56. An electronic control unit 176 is also installed on the interior side of the double facade 110, in one implementation, to change configurations, control the operation and make use of the various features of the improved multi-feature heating and ventilation device. In one implementation, the electronic control unit 176 includes various buttons that when pressed control the operation of the device. In an alternative implementation, the double skin facade can be controlled using a computer program or application that can be installed on a computing device such as a mobile device, using methods known in the art.

The interior side of the double skin facade 110 also includes double barriers 130 which are configured to be opened when the modules 100 are opened. In one implementation, opening the modules 100 causes the shells 98 and the turbines 122 to move forward. Because each barrier 130 is attached to a turbine 122, the double barriers 130 are pulled up when the turbine 122 moves forward thus creating a passageway through which air can enter the building. This provides more ventilation and can have cooling effects as the concentrated wind enters the building, thus creating a breeze.

Figure 6A:
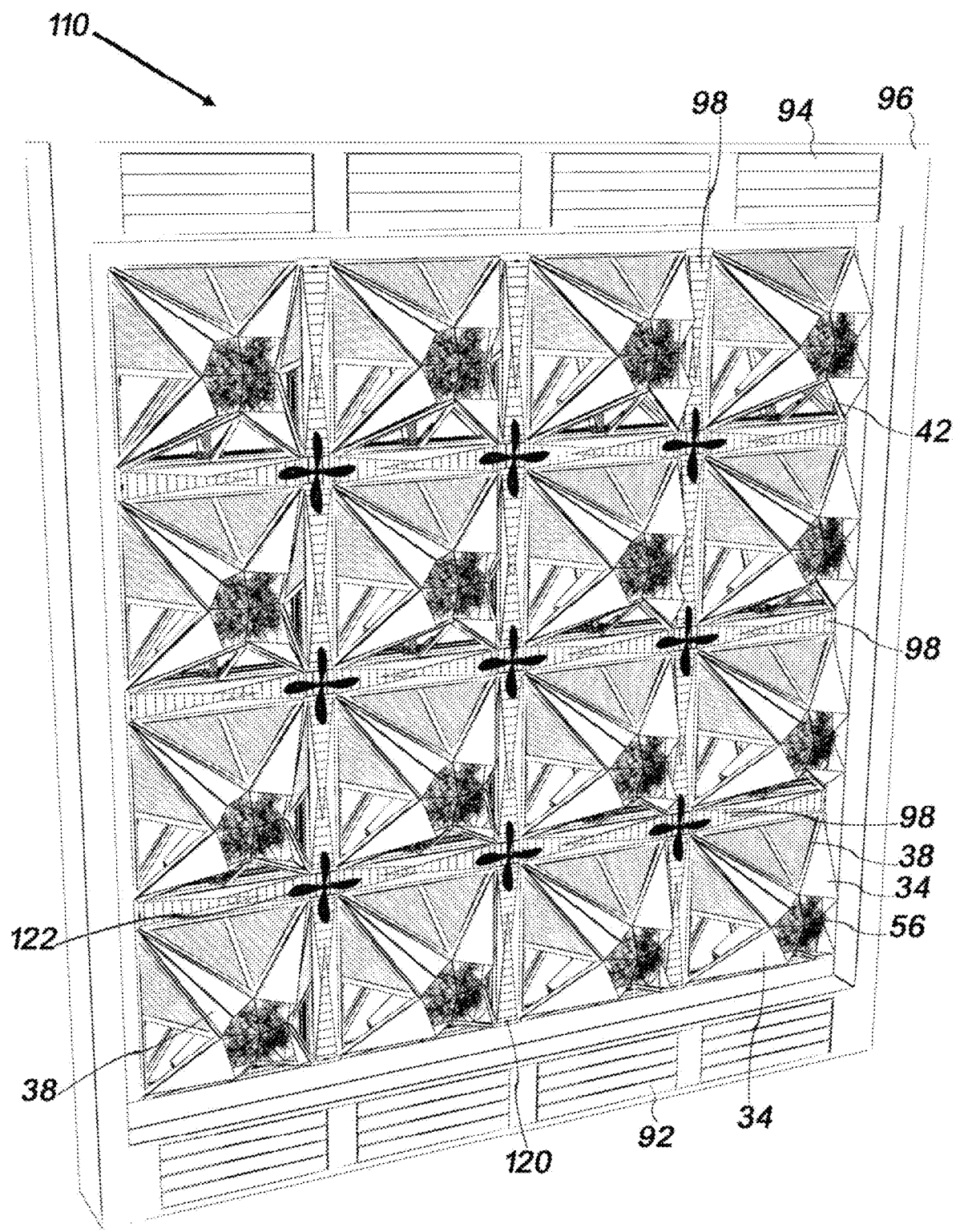
FIGS. 6A-6D illustrate schematic drawings of various vantage point views of the exterior side (FIGS. 6A-6C) and the interior side (FIG. 6D) of an improved multi-functional air heater and natural ventilating device, when the building block modules are closed and a plurality of plants face the outdoor, according to an implementation.

FIG. 6A illustrates a slanted view of one implementation of the exterior side of a double skin facade 110, when the modules 100 are closed while the plants 56 face the outdoor. As can be seen, in this configuration, the shells 98 are flat, while the movable panels 38 face downward to close the modules 100. In one implementation, side panels 34 are folded up to allow the movable panels to extend.

Figure 6B:
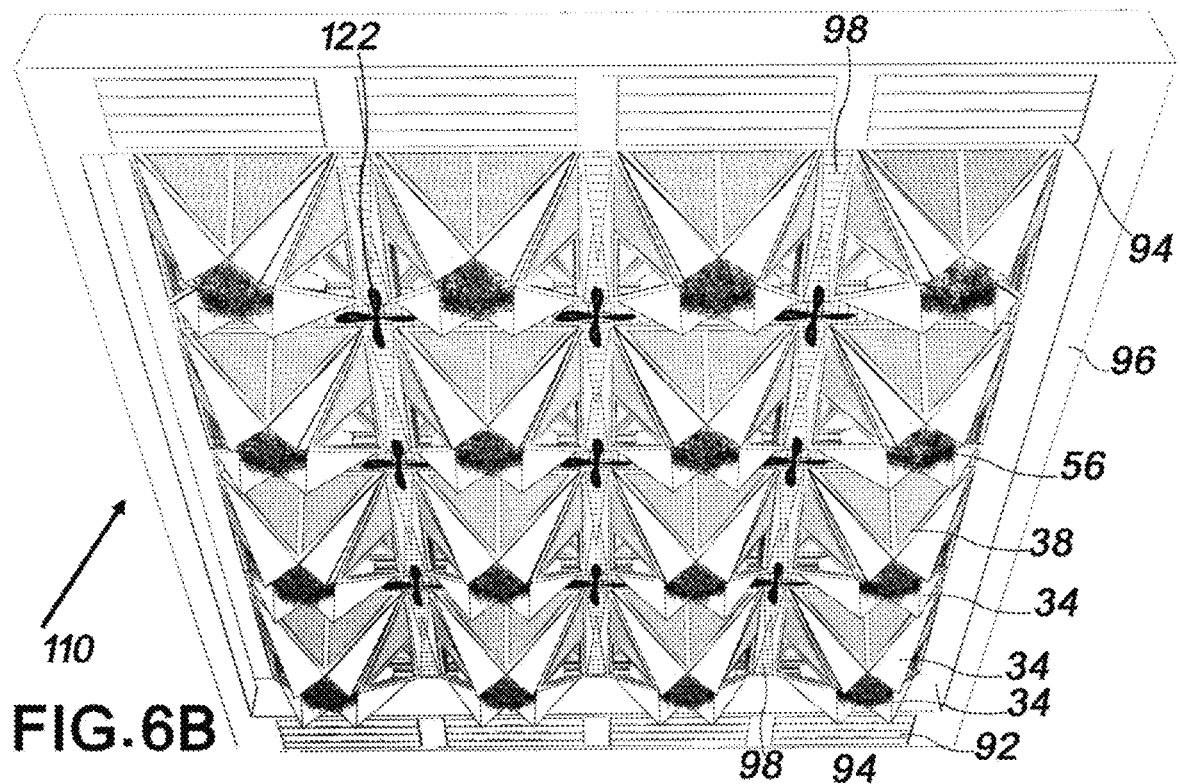
Figure 6C:
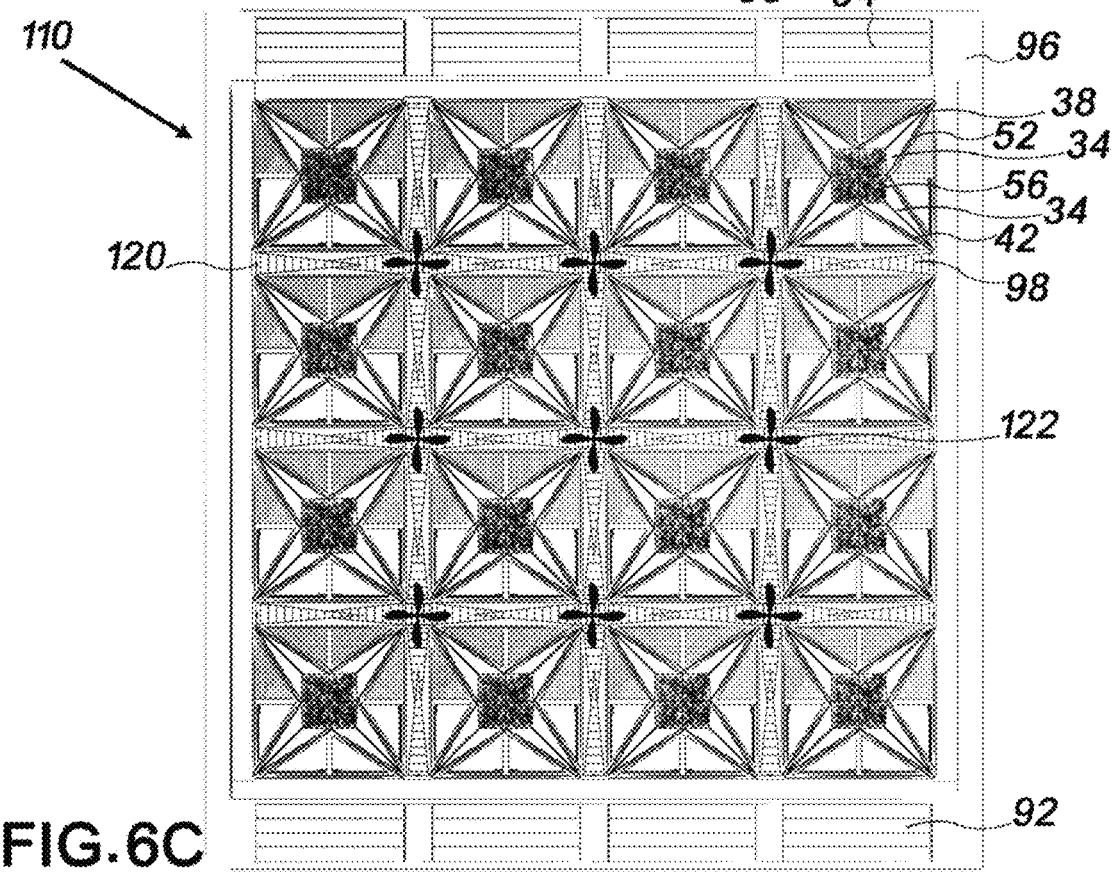
Figure 6D:
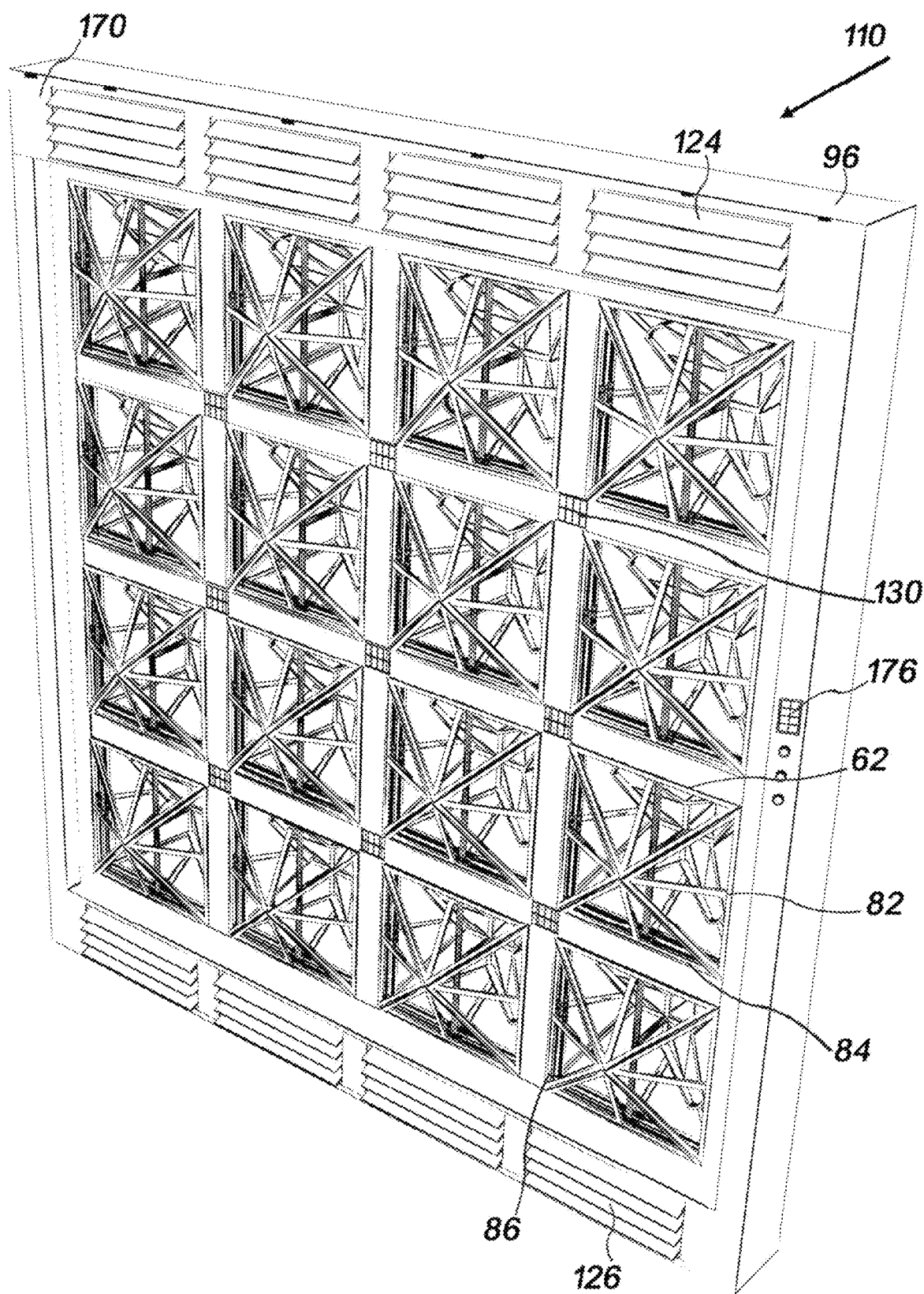

FIG. 6B illustrates a top view of the exterior side of the double skin facade 110, when the modules 100 are closed while the plants 56 face the outdoor, in one implementation. FIG. 6C illustrates a front view of the exterior side of the double skin facade 110, when the modules 100 are closed while the plants 56 face the outdoor, in one implementation. FIG. 6D, in turn, illustrates a side view of the interior side of the double skin facade 110, when the modules 100 are closed and the plants face the outdoor, in one implementation. In this configuration, the double barriers 130 are closed thus preventing air from entering the building through the passageway created by opening the double barriers 130.

Figure 7A:
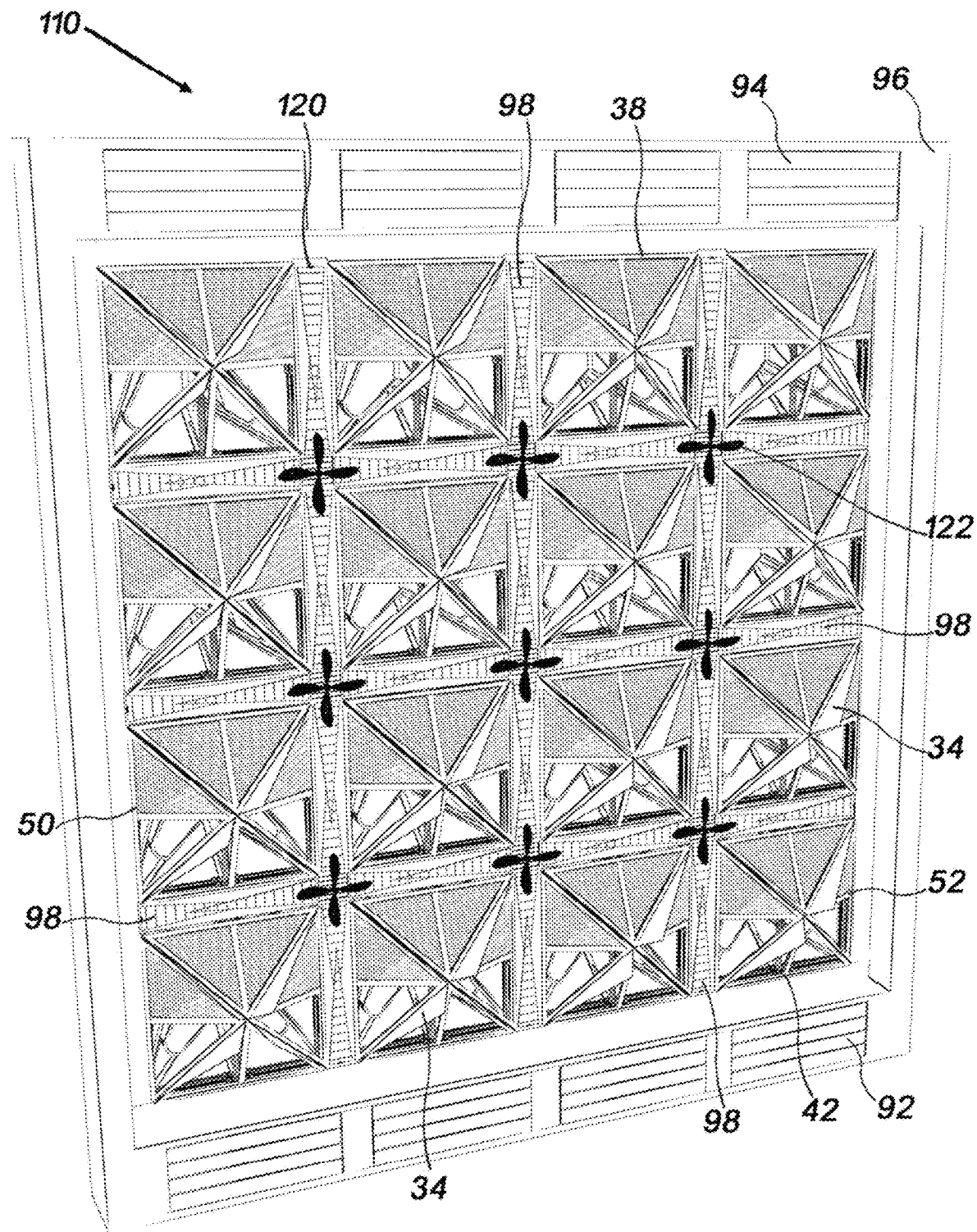
FIGS. 7A-7D illustrate schematic drawings of various vantage point views of the exterior side (FIGS. 7A-7C) and the interior side (FIG. 7D) of an improved multi-functional air heater and natural ventilating device, when the building block modules are closed and a plurality of plants face the interior, according to an implementation.

FIG. 7A illustrates a slanted view of one implementation of the exterior side of a double skin facade 110, when the modules 100 are closed while the plants 56 face the inside of the building. As can be seen, in this configuration, the shells 98 are also flat, while the movable panels 38 face downward to completely close the modules 100. In one implementation, side panels 34 are folded up to allow the movable panels to extend.

Figure 7B:
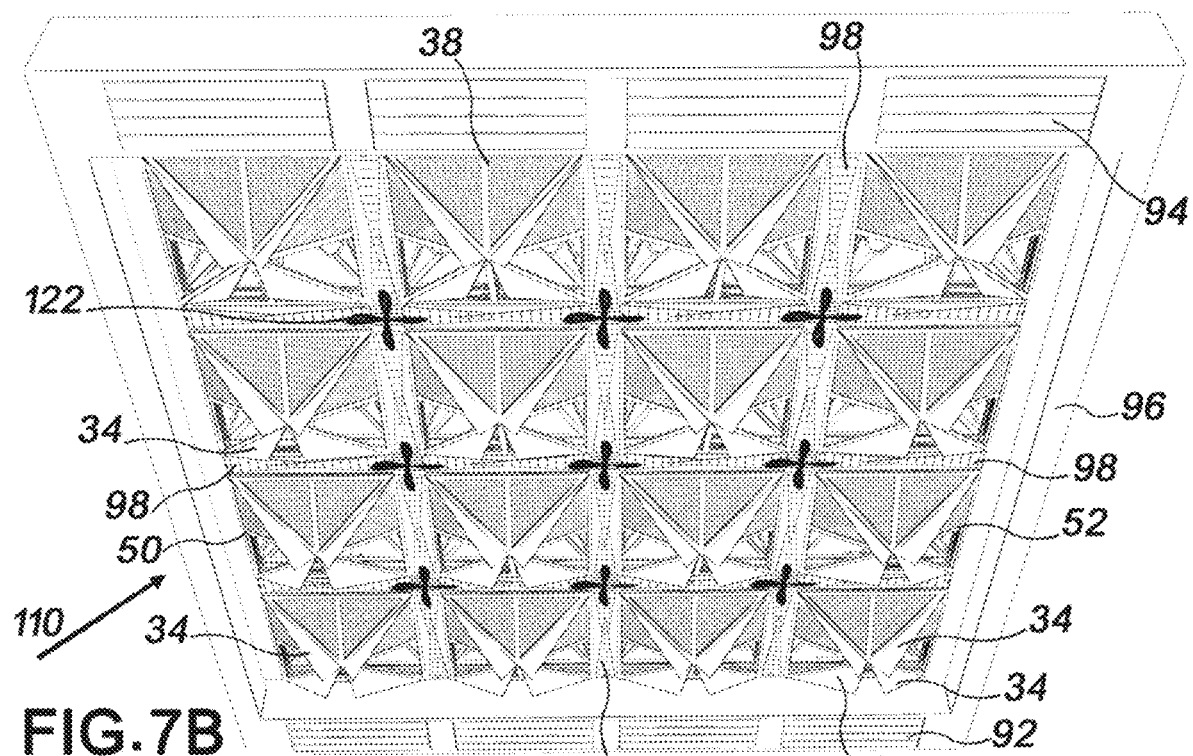
Figure 7C:
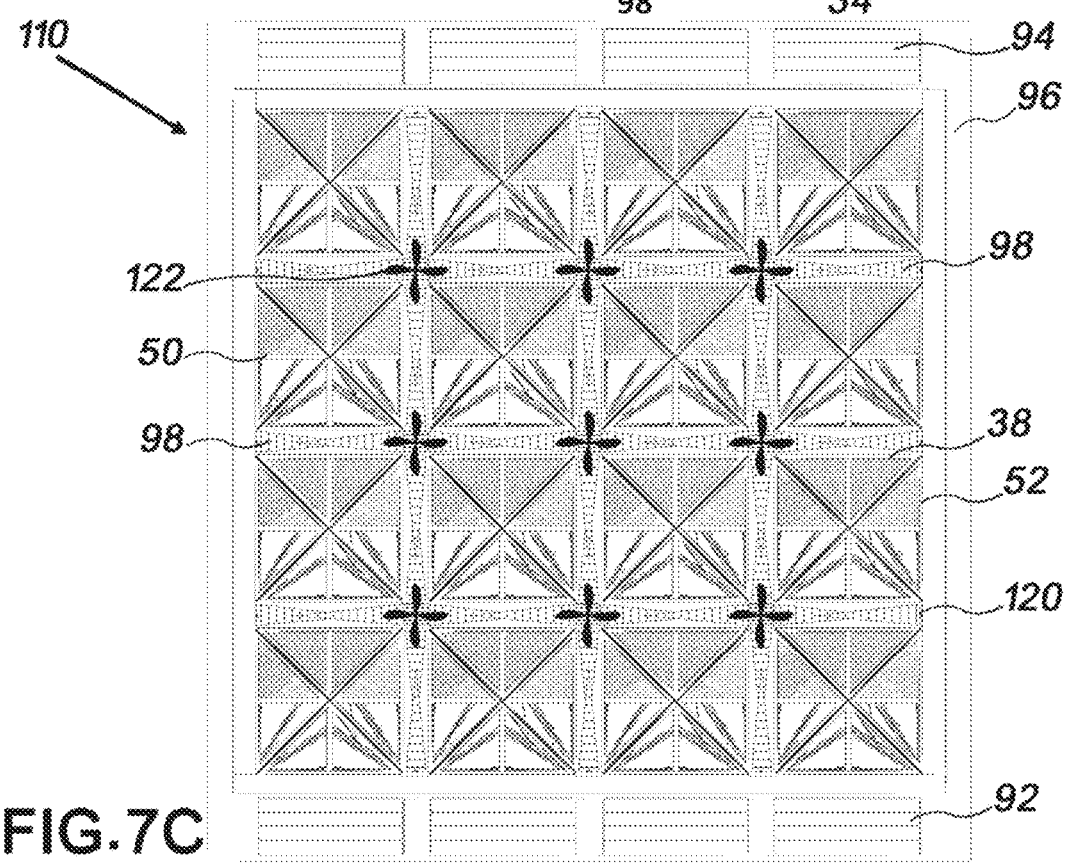
Figure 7D:
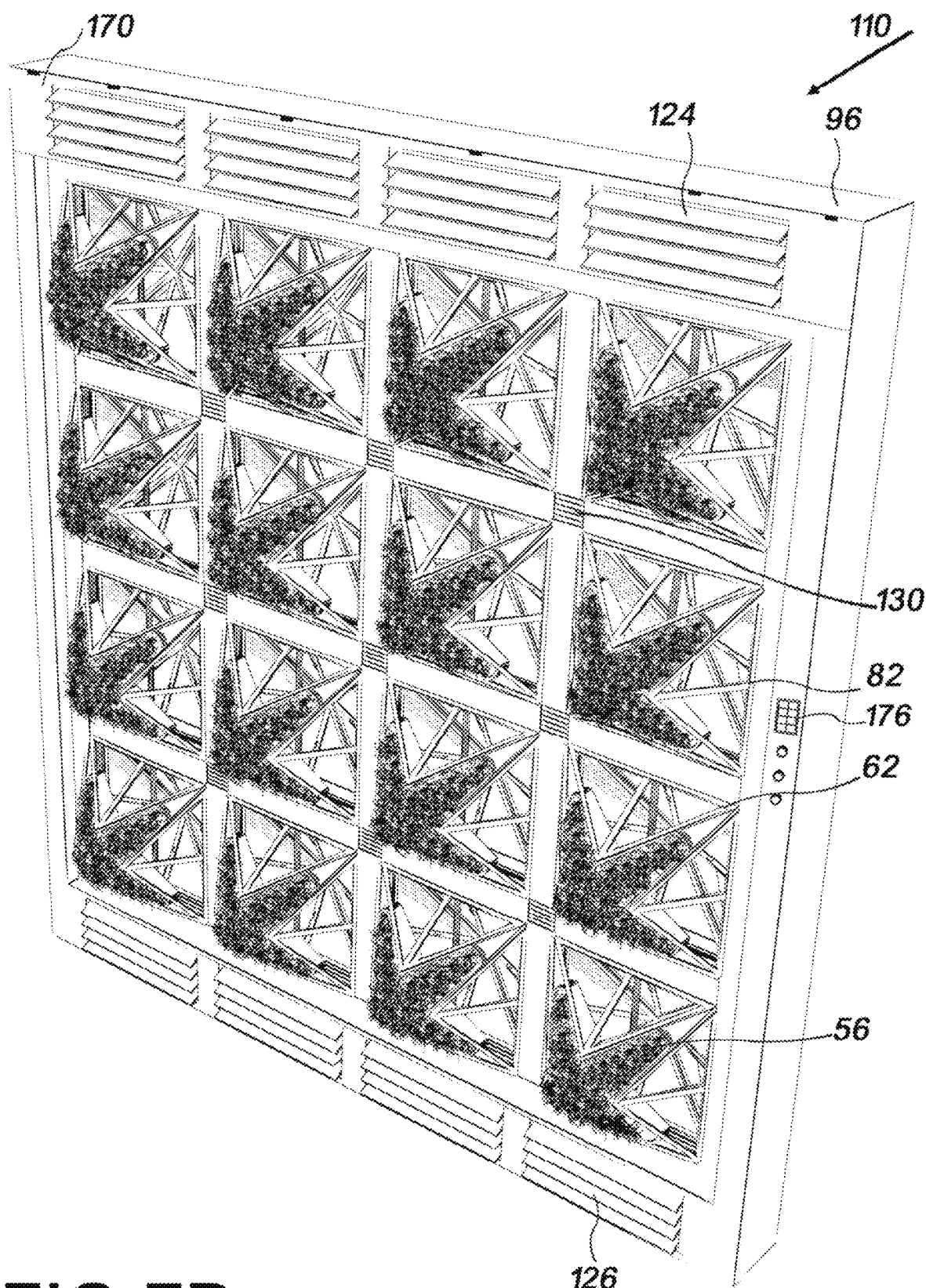

FIG. 7B illustrates a top view of the exterior side of the double skin facade 110, when the modules 100 are closed while the plants 56 face the outside of the building, in one implementation. FIG. 7C illustrates a front view of the exterior side of the double skin facade 110, when the modules 100 are closed while the plants 56 face the inside of the building, in one implementation. FIG. 7D, in turn, illustrates a slanted view of the interior side of the double skin facade 110, when the modules 100 are closed and the plants face the inside of the building, in one implementation. In this configuration, the double barriers 130 are also closed thus preventing air from entering the building through the passageway created by opening the double barriers 130.

Figure 8A:
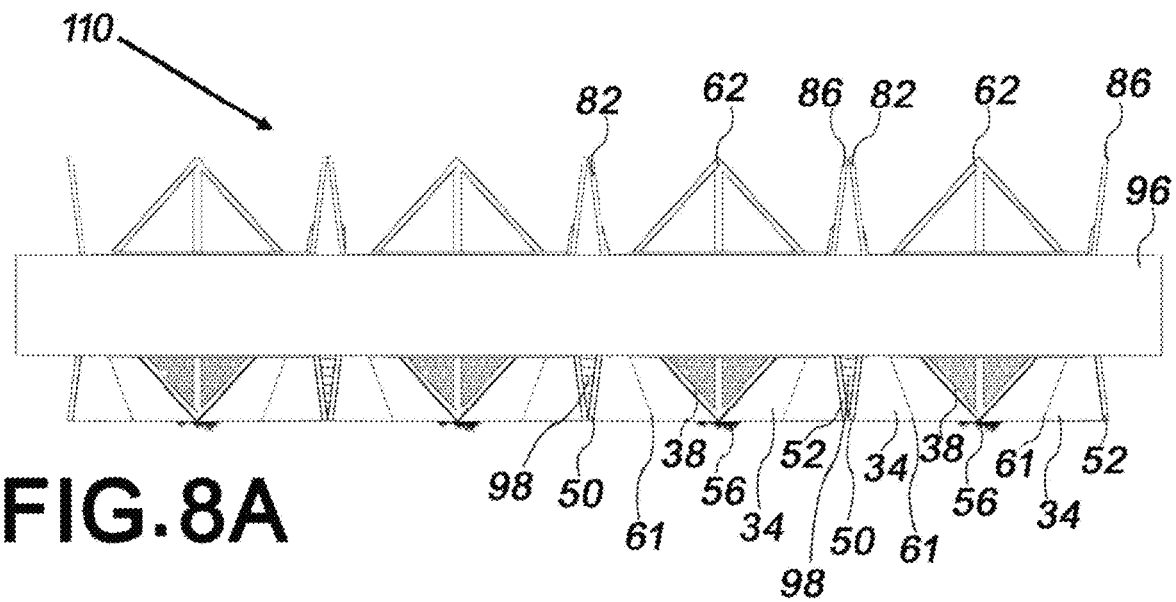
FIGS. 8A-8C illustrate schematic drawings of a top view of an improved multi-functional air heater and natural ventilating device, during three different configurations of the building block modules, according to an implementation.
Figure 8B:
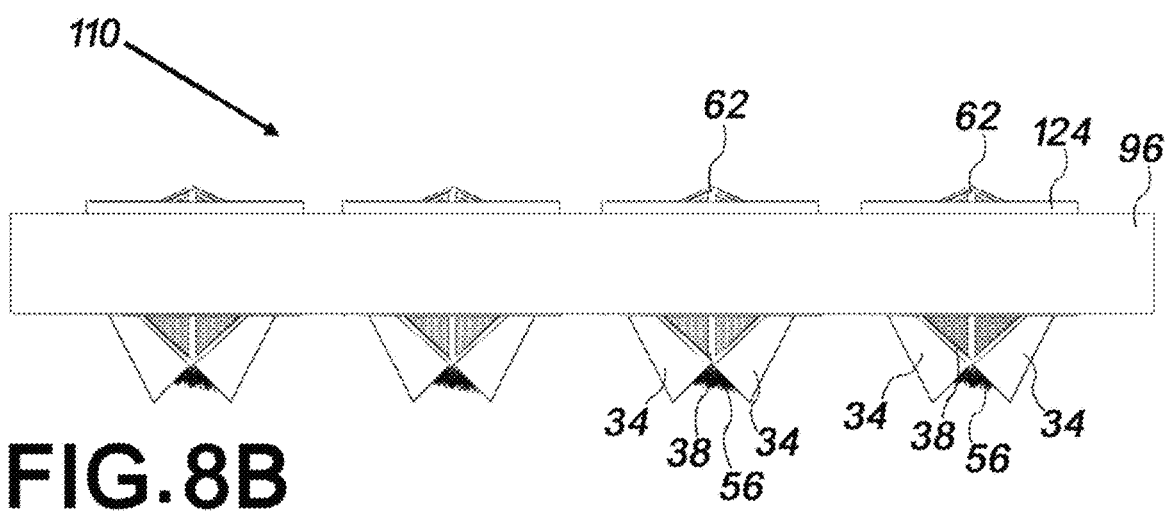
Figure 8C:
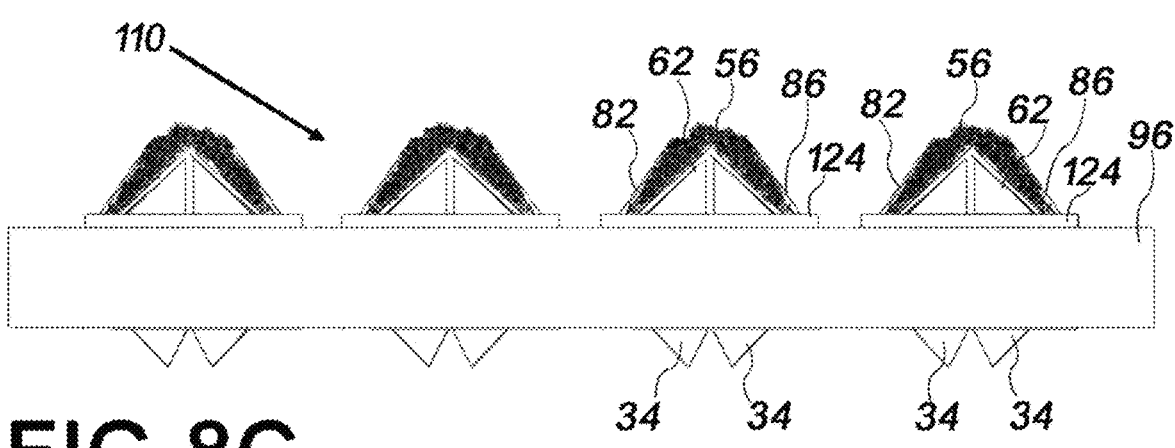

FIGS. 8A-8C illustrate top views of the double skin facade 110, for each of three different configurations for the double skin facade 110, in one implementation. FIG. 8A illustrates a top view of the mounting structure 96, when the modules 100 are open to allow ventilation. As can be seen, in this configuration, the side panels 34 are fully open, while the top movable panels 38 are facing upward to act as shades and prevent direct sunlight from entering the building. Small portions of the plants 56, which are facing the outside can be seen from this view. FIG. 8A also illustrates a top view of the side panels 62 which are also facing upward to allow air to enter the building.

FIG. 8B illustrates a top view of the mounting structure 96, when the modules 100 are closed while the plant 56 is facing the outdoor, in one implementation. As can be seen, in this configuration, the side panels 34 are folded and the top movable panels 38 and 62 are facing downward to close the modules 100. A portion of the plants 56 can be seen from this vantage point, showing that the plants 56 are exposed to the outside. In this configuration, the collector surfaces 78 are positioned for maximum exposure to sunlight.

FIG. 8C illustrates a top view of the mounting structure 96, when the modules 100 are closed while the plants 56 face the interior side of the building, in one implementation. As can be seen, in this configuration, the side panels 34 are also folded, but have a slightly different angle from that shown in FIG. 8B, to close the space that was left before for the plant 56. Moreover, the top movable panels 38 and 62 are facing downward to completely close the modules 100. Plants 56 are facing the interior side of the building.

FIGS. 9A-9D illustrate side views of the mounting structure 96 of the double skin facade 110, for each of four different configurations of the double skin facade 110, in one implementation. FIG. 9A illustrates a side view of one column of modules in the mounting structure 96 when the modules 100 are open to allow ventilation. As shown, a fan 142 which is used, in one embodiment, to force air into the building through the top interior vents 124. In one embodiment, the fan 76 includes Nano membranes for filtering the air before it gets released into the building. The mounting structure 96 also includes electric elements 148 for storing electric energy generated by the collector surfaces 78, which are made of solar cells, in one implementation, and the electric energy generated by the wind turbines 122. The stored energy may be used to heat up the elements 148 which in turn can heat up the air before it exits into the building. This is particularly useful at night or during cloudy days where the energy from the sun is limited. By using the previously stored energy, air could continue to be heated.

In one implementation, the mounting structure 96 also includes a water storage unit 140 for storing and distributing water to the plants 56. The water storage unit 140 is connected, in one implementation to one or more pipes (not shown) that run inside the vertical rods 32 and horizontal rods 72. In an alternative implementation, the vertical rods 32 and horizontal rods 72 act as pipes to transfer water from the storage unit to each plant 56. The horizontal rods 72 include one or more openings at their intersection with the plant housing 54 through which water can enter the plant housing 54 and thus water the plant 56. In one implementation, water is supplied manually to the water storage unit 140 through the hatch 170. Alternatively, the water storage unit 140 is connected through a pipe to the building's water system and is set up to automatically retrieve water either based on a schedule or when and/or if needed. In one implementation, the mounting structure 96 also includes an automated actuator 146 that can be controlled by the control panel 176 to open and close each set of the top and bottom vents.

FIGS. 9A-9D also show various possible configurations for each set of the top and bottom vents and how by closing and/or opening each of those sets of vents the functionalities of the device can change. For example, as illustrated in FIG. 9A-9B, the device can be utilized solely as a ventilator and/or fan by opening all the vents. In one implementation, this configuration is used when it is hot or warm outside and thus ventilation is needed. In this manner, air can enter from the top and bottom external vents 94 and 92 and exit from the top and bottom internal vents 124 and 126, thus creating a natural air flow that can help cool the building.

FIG. 9C illustrates a configuration where the modules are closed, while the plants 56 face the outside. In one implementation, this configuration is used when it is cold outside. In such a scenario, the top and bottom exterior vents 94 and 92 are closed, while the top and bottom interior vents 124 and 126 are open. In this situation, cold air from inside the building enters the device, moves through the protected spaces of various modules and gets heated by the heat radiated from the absorbent surfaces of the collectors, the non-reflective glass and the greenhouse like environment of the protected spaces, before moving up and leaving the device through the top vents 124 and entering the building again. In one implementation, the fan 142 acts as a suction unit to make sure the air enters from the bottom and leaves at the top of the double skin facade device. In situations where it is cloudy and/or too cold to warm up the air solely by moving it through the protected spaces, heat from the elements 148 may be used to heat up the air before it enters the building again.

FIG. 9D shows a configuration where because the weather outside it too hot and/or a central air conditioning unit is operating to bring down the indoor temperature, ventilation is not appropriate. As a result, both internal vents 124 and 126 are closed while the two external vents 94 and 96 are kept open. In this manner, hot air does not enter the building, but air is allowed to pass through the external bottom vent 92 through the plurality of protected spaces and escape from the top external vent 94. In this configuration, the device is only used to produce and store electricity.

Other configurations are possible for the various vents. For example, in one implementation, the double skin facade can be used as a heater and ventilator simultaneously. This is applicable in cases where even though heating is needed, ventilation is also required. In such cases, the bottom external vents 92 and the top internal vents 124 are open, while the bottom internal vents 126 and the top external vents 94 are closed. This causes cold air to enter through the bottom external vents 92, pass through the absorbent surfaces of the cubes to heat up and enter the building through the top internal vents 124. This configuration provides both ventilation and heating.

Figure 10:
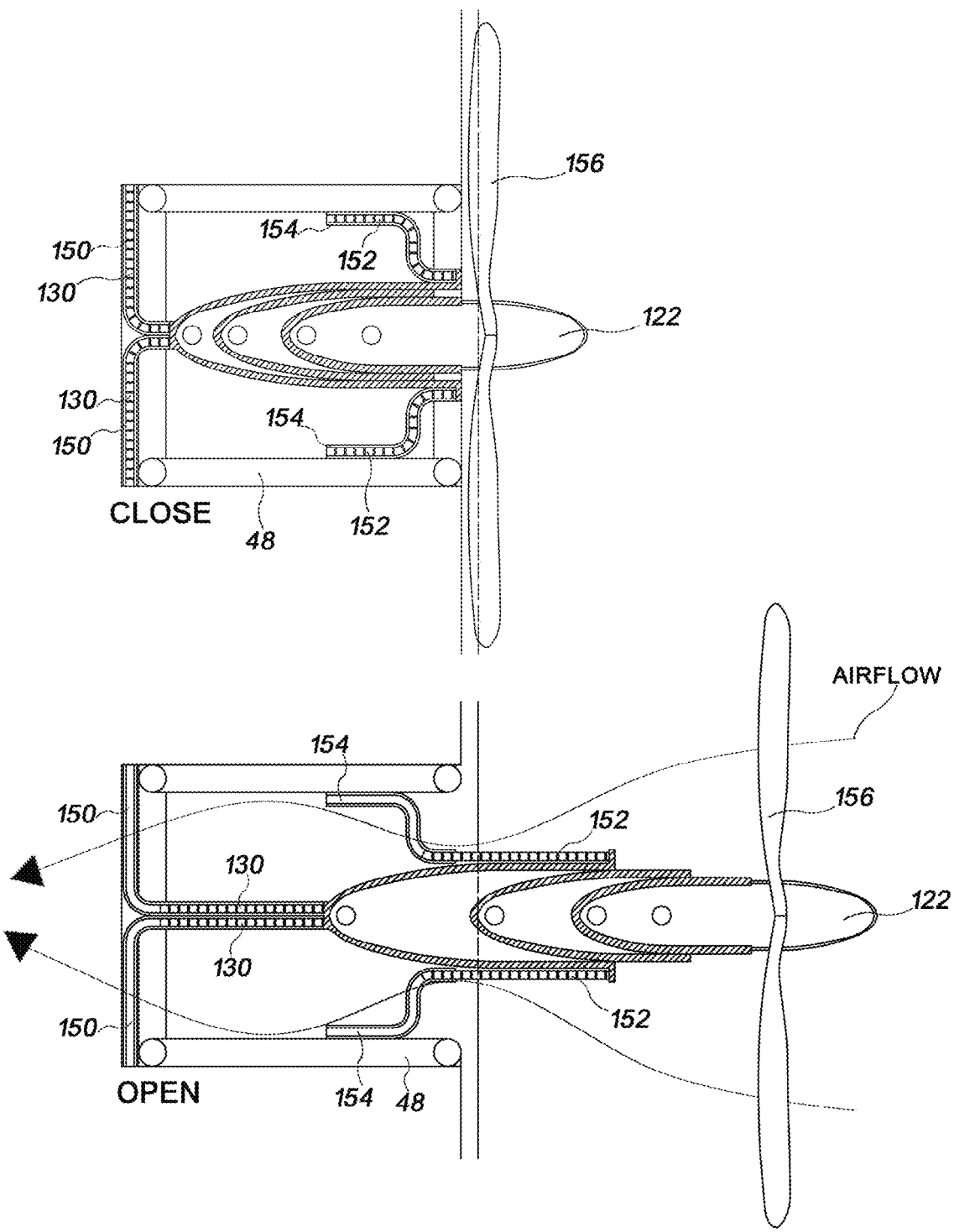
FIG. 10 illustrates a schematic drawing of a wind turbine system incorporated into the improved multi-functional air heater and natural ventilator unit according to an implementation. [Inventors: please rename FIG. 9E, FIG. 10 and rename FIGS. 10A-10D, to 11A-11D.

FIG. 10 illustrates two configurations for the wind turbine system along with components that make up the wind turbine system utilized in the double skin facade system, in one implementation. The wind turbine system includes, in one implementation, one or more blades 156 that are rotatable around the body of the turbine 122. In one implementation, the turbine 122 is a horizontal-axis wind turbine (HAWT), and includes slide-able portions that can move inside each other and provide the ability to move the turbine 122 forward. The turbine 122 may be moved by a rotor and includes a generator. When the turbine 122 is pushed forward, it is ready to rotate and thus produce electricity when exposed to wind. Upon the wind blowing through the funnel, when the wind has an exit path, the turbine 122 rotates more continuously, thus creating more electricity. Because of this, the wind turbine system utilized in the preferred implementation of the present invention has been designed such that when the turbine 122 moves forward, it moves the double barriers 130, which are movable on guiding rails 150, to open them, thus causing the wind to have an exit path and to provide ventilation for the building. In one implementation, the wind turbine system also includes movable sliders 152 which are connected to the turbine 122 and movable on guiding rails 154. When the turbine 122 moves forward, it moves the movable sliders 152 to open them, and thus help create an exit path for the wind to enter into the building.

Figure 11B:
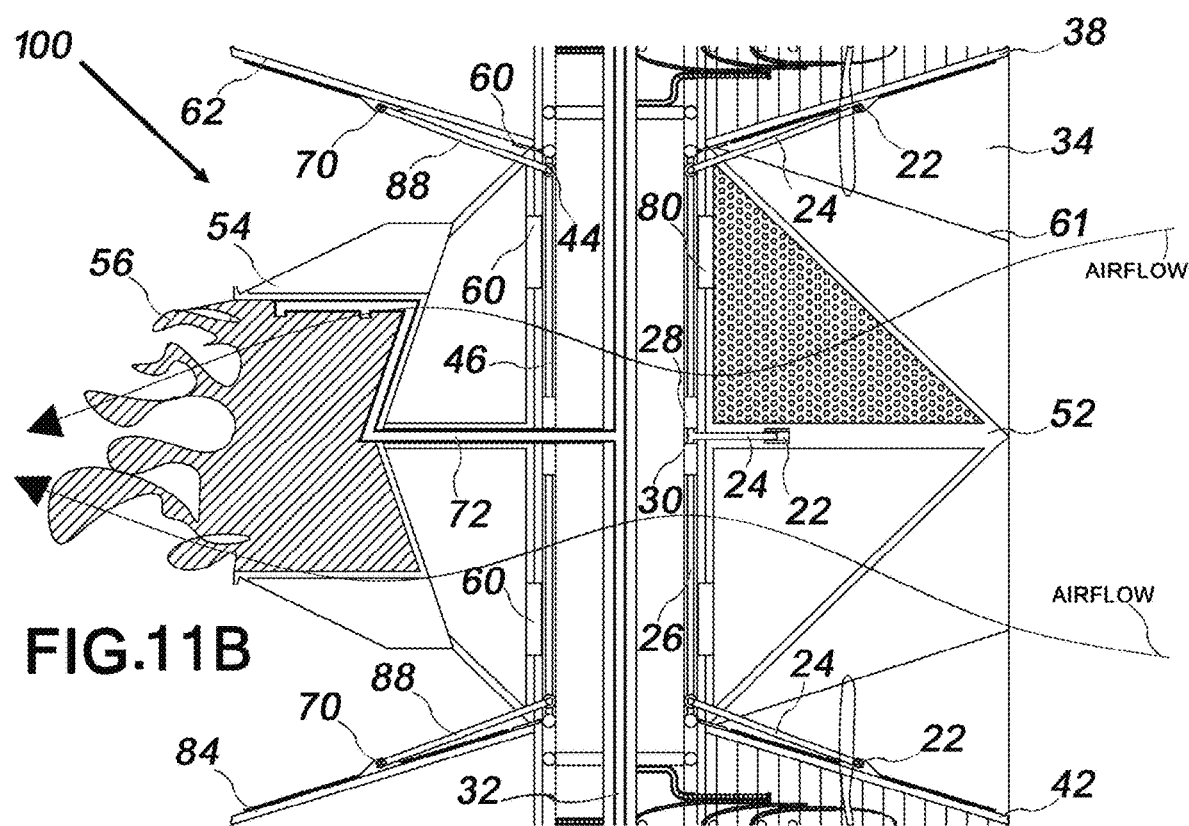

FIGS. 11A-11D illustrate side views of a module 100 for each of the four different configurations available for the module 100 of the double skin facade 110, in one implementation. FIG. 11A illustrates a side view of the module 100 when the module 100 is open to allow ventilation and the plant 56 is facing outside. As shown, in this configuration, air flows from the outside around the plant 56 towards the interior of the building. The open space around the movable panels and the side panels allow air to freely travel, thus creating a pleasant ventilation and breeze.

FIG. 11B. illustrates a side view of the module 100, when the module 100 is open but the plant 56 is facing toward the inside of the building. Though the plant 56 is located at a different position, in this configuration, air can still flow from the open space in between the exterior movable panels and around the interior movable and side plans to enter the building.

Figure 11C:
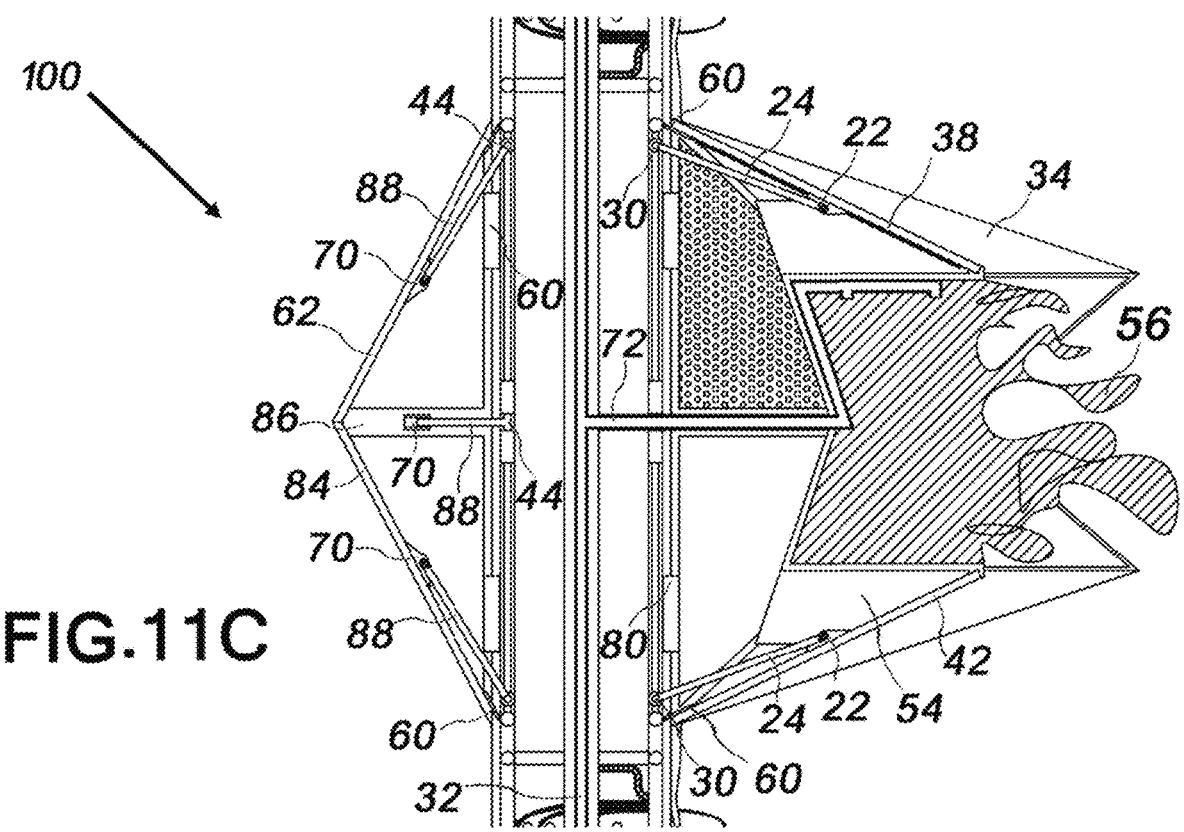

FIG. 11C illustrates a side view of the module 100, when the module 100 is closed while the plant 56 is facing the outdoor. In this configuration, the movable panels move down to close the space around the plant 56 and prevent any air from entering the building through the module 100.

Figure 11D:
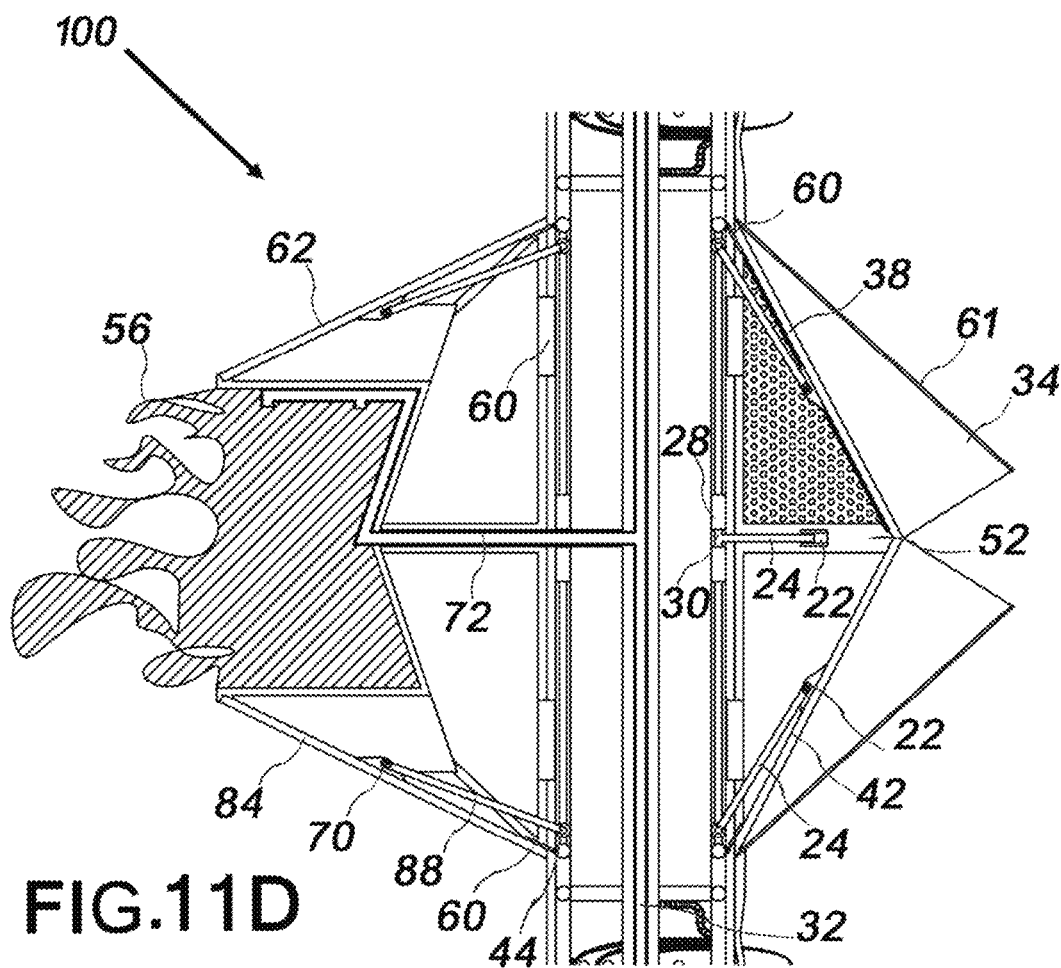

FIG. 11D illustrates a side view of the module 100, when the module 100 is closed while the plant 56 is facing toward the interior of the building. In this configuration, similar to the configuration shown in FIG. 11C, the movable panels move down to close the space around the plant 56 and prevent any air from entering the building through the module 100.

Accordingly, the double skin facade system is a multi-functional heating and ventilation device that can be used in a variety of ways to provide heat, produce and store solar and wind electricity, and provide natural cooling and ventilation. The device is easy and inexpensive to operate. In one implementation, the functionality of the device can easily be changed with simple touches of buttons and/or other known methods of operating electronic devices. In one implementation, it also does not require any external electricity.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A multi-functional heating and ventilation device comprising:
   a mounting structure having an interior side and an exterior side;
   a water storage unit;
   at least one set of vents on each of the interior side and the exterior side;
   a plurality of modules housed in the mounting structure, each module having an exterior side and an interior side and each module comprising at least one movable panel containing one or more collector surfaces on the module's exterior side and at least one glass panel on each of the module's exterior side and interior side, a rotatable plant housing, and a wind turbine adjacent to each module;
   wherein:
      the one or more collector surfaces are configured to collect solar energy,
      the wind turbine is configured to collect and convert wind energy,
      the plant housing is configured to house one or more plants,
      the water storage unit is configurated to provide water to the one or more plants,
      each of the plurality of modules is configured to create a protected space in between the module's exterior side and the module's interior side for heating air when the movable panels and the at least one glass panel are moved to close the module, and
      the plurality of protected spaces are configured to create an open passageway for ventilation in the mounting structure.

2. The multi-functional heating and ventilation device of claim 1, further comprising at least one actuator configured to move one or more of the at least one movable panels.

3. The multi-functional heating and ventilation device of claim 1, further comprising at least one actuator configured to rotate the rotatable plant housing to enable the plant housing to face both the interior of the building and the outdoor.

4. The multi-functional heating and ventilation device of claim 3, further comprising a vertical rod connected to the actuator and a horizontal rod connected to the vertical rod.

5. The multi-functional heating and ventilation device of claim 4, wherein water from the water storage unit is provided to the one or more plants through the vertical rod and the horizontal rod.

6. The multi-functional heating and ventilation device of claim 1, wherein the one or more sets of vents are configured to regulate air flow and temperature.

7. The multi-functional heating and ventilation device of claim 6, wherein the one or more vents include at least one set of top interior vents, at least one set of bottom interior vents, at least one set of top exterior vents, and at least one set of bottom exterior vents.

8. The multi-functional heating and ventilation device of claim 7, where each set of the at least one set of top interior vents, at least one set of bottom interior vents, at least one set of top exterior vents, and at least one set of bottom exterior vents can be opened and closed separately to provide various functionalities for the multi-functional heating and ventilation device.

9. The multi-functional heating and ventilation device of claim 1, further comprising a plurality of elements for collecting and storing electrical energy.

10. The multi-functional heating and ventilation device of claim 1, further comprising a fan for regulating air flow.

11. The multi-functional heating and ventilation device of claim 10, further comprising a plurality of Nano membranes for filtering air.

12. The multi-functional heating and ventilation device of claim 1, wherein each module further comprises a plurality of movable side panels.

13. The multi-functional heating and ventilation device of claim 1, wherein each module further comprises a plurality of adjustable parts configured to fill one or more spaces between edges of the plant housing and one or more edges of adjacent movable panels to ensure there is no space left between the movable panels and the plant housing.

14. The multi-functional heating and ventilation device of claim 1, wherein each of the plurality of modules provides a configuration where the module is completely closed and the plant housing faces the outdoor.

15. The multi-functional heating and ventilation device of claim 1, wherein each of the plurality of modules provides a configuration where the module is completely closed and the plant housing faces the interior.

16. The multi-functional heating and ventilation device of claim 1, wherein each of the plurality of modules provides a configuration where the module is open and the plant housing faces the interior.

17. The multi-functional heating and ventilation device of claim 1, wherein each of the plurality of modules provides a configuration where the module is open and the plant housing faces the outdoor.

18. The multi-functional heating and ventilation device of claim 1, wherein two of the at least one movable panels are attached to each other through one or more movable triangular shaped shells.

19. The multi-functional heating and ventilation device of claim 1, wherein the module further comprises one or more side panels attached to the at least one movable panel.

20. The multi-functional heating and ventilation device of claim 19, wherein:
   the side panels can be opened to form a funnel with at least one or more side panels from an adjacent module,
   the wind turbine is located in the middle of the funnel, and
   the wind turbine is movable.

* * * * *